United States Patent
Matsuoka

(10) Patent No.: US 8,254,672 B2
(45) Date of Patent: Aug. 28, 2012

(54) IMAGE COMPRESSING METHOD, IMAGE COMPRESSING APPARATUS AND IMAGE FORMING APPARATUS

(75) Inventor: Teruhiko Matsuoka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 610 days.

(21) Appl. No.: 12/511,196

(22) Filed: Jul. 29, 2009

(65) Prior Publication Data

US 2010/0027882 A1 Feb. 4, 2010

(30) Foreign Application Priority Data

Jul. 30, 2008 (JP) ................................ 2008-196929

(51) Int. Cl.
*G06K 9/36* (2006.01)
(52) U.S. Cl. ........................................ 382/166; 382/173
(58) Field of Classification Search .......... 382/232–253, 382/166, 173, 176, 282–283; 358/1.2, 1.9, 358/539–540, 426.01–426.16, 464
See application file for complete search history.

(56) References Cited

U.S. PATENT DOCUMENTS

| 6,701,012 B1 | 3/2004 | Matthews | |
| 7,376,266 B2 * | 5/2008 | Simard et al. | 382/166 |
| 7,783,117 B2 * | 8/2010 | Liu et al. | 382/232 |
| 7,991,229 B2 * | 8/2011 | Xiao et al. | 382/176 |
| 8,131,092 B2 * | 3/2012 | Usui et al. | 382/232 |
| 2003/0198381 A1 | 10/2003 | Tanaka et al. | |
| 2010/0183223 A1 * | 7/2010 | Matsuoka | 382/166 |

FOREIGN PATENT DOCUMENTS

| JP | 2002-94805 A | 3/2002 |
| JP | 2004-229261 A | 8/2004 |

* cited by examiner

*Primary Examiner* — Ishrat I Sherali
(74) *Attorney, Agent, or Firm* — Birch, Stewart, Kolasch & Birch, LLP

(57) ABSTRACT

When priority is placed on a small file size, the number N of kinds foreground identifiers used for identifying color information of respective pixels of a foreground of a color image is reduced to M, which is smaller than N. For this purpose, a foreground identifier corresponding to pixels in number not more than a prescribed number K of pixels is replaced with a background identifier. When M is not more than a prescribed number P, M binary images respectively corresponding to the M kinds of identifiers are generated on the basis of a foreground layer including the M kinds of foreground identifiers, the respective binary images are subjected to lossless compression, and a background layer generated on the basis of the foreground layer is subjected to lossy compression.

11 Claims, 24 Drawing Sheets

FIG. 5

| SIZE PRIORITY MODE | | | QUALITY PRIORITY MODE | | | | |
|---|---|---|---|---|---|---|---|
| N→M | | | N≤P | | P<N≤Q<br>N→M<br>(M≥P) | | N>Q |
| M≤P | M>P | | | | M=P | M>P | |
| LOSSLESS COMPRESSION (M IMAGES)<br>LOSSY COMPRESSION | LOSSY COMPRESSION | | LOSSLESS COMPRESSION (N IMAGES)<br>LOSSY COMPRESSION | | LOSSLESS COMPRESSION (M IMAGES)<br>LOSSY COMPRESSION | LOSSY COMPRESSION | LOSSY COMPRESSION |

FIG. 8

| ADDRESS | IDENTIFIER | MINIMUM X COORDINATE VALUE | MAXIMUM X COORDINATE VALUE | MINIMUM Y COORDINATE VALUE | MAXIMUM Y COORDINATE VALUE | R | G | B | NUMBER OF PIXELS |
|---|---|---|---|---|---|---|---|---|---|
| 0 | 0 | 0 | 15 | 0 | 19 | 255 | 255 | 255 | 248 |
| 1 | 1 | 1 | 3 | 14 | 18 | 0 | 255 | 0 | 11 |
| 2 | 2 | 5 | 8 | 13 | 17 | 0 | 255 | 255 | 9 |
| 3 | 3 | 6 | 15 | 13 | 19 | 255 | 0 | 0 | 22 |
| 4 | 4 | 2 | 4 | 2 | 7 | 128 | 0 | 128 | 12 |
| 5 | 5 | 7 | 11 | 2 | 7 | 0 | 0 | 255 | 18 |

FIG. 18

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 | 0 | 1 | 1 |
| 14 | 0 | 0 | 0 | 0 | 0 | 0 | 0 | 0 | 0 | 0 | 0 | 0 | 0 | 0 | 1 | 1 |
| 15 | 0 | 0 | 0 | 0 | 0 | 0 | 0 | 0 | 0 | 0 | 0 | 0 | 0 | 0 | 1 | 1 |
| 16 | 0 | 0 | 0 | 0 | 0 | 0 | 0 | 0 | 0 | 0 | 0 | 0 | 0 | 0 | 1 | 1 |
| 17 | 0 | 0 | 0 | 0 | 0 | 0 | 0 | 0 | 0 | 0 | 0 | 0 | 0 | 0 | 1 | 1 |
| 18 | 0 | 0 | 0 | 0 | 0 | 0 | 0 | 0 | 0 | 0 | 0 | 0 | 0 | 0 | 1 | 1 |
| 19 | 0 | 0 | 0 | 0 | 0 | 0 | 1 | 1 | 1 | 1 | 1 | 1 | 1 | 1 | 1 | 1 |

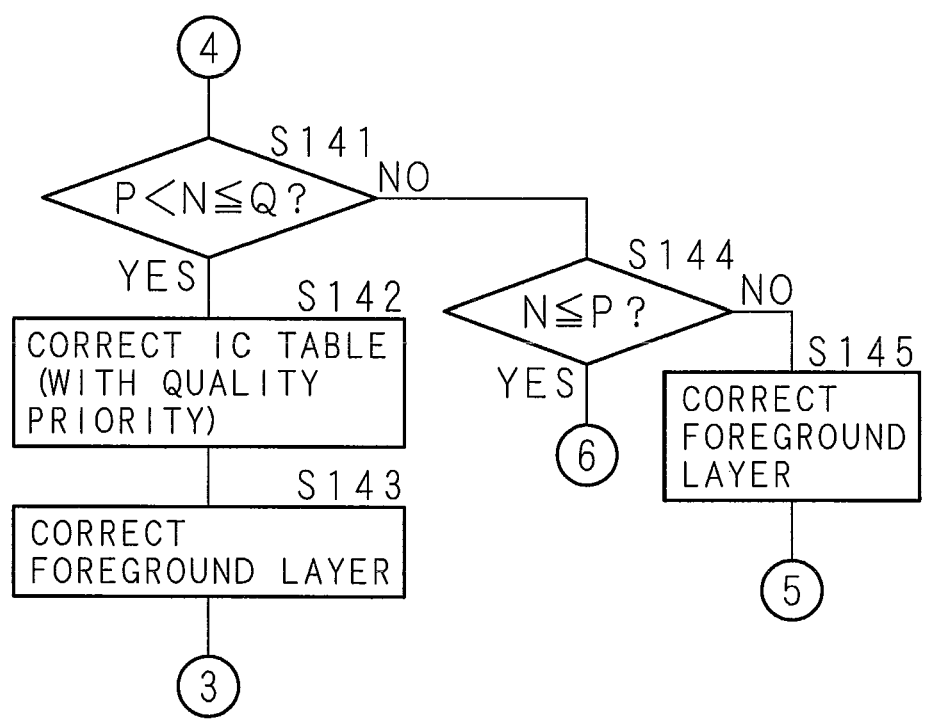
F I G. 2 3

IMAGE COMPRESSING METHOD, IMAGE COMPRESSING APPARATUS AND IMAGE FORMING APPARATUS

CROSS-REFERENCE TO RELATED APPLICATIONS

This Nonprovisional application claims priority under 35 U. S. C. §119(a) on Patent Application No. 2008-196929 filed in Japan on Jul. 30, 2008, the entire contents of which are hereby incorporated by reference.

BACKGROUND

1. Technical Field

The present invention relates to an image compressing method, an image compressing apparatus and an image forming apparatus in which a color image is compressed.

2. Description of Related Art

Digital image processing systems have been remarkably developed in recent years, and establishment of digital image processing techniques has been proceeded. In the field of, for example, copying machines and multi-function printers employing an electrophotographic method or an inkjet method, a document of a manuscript is read with a scanner to be stored as a document file of electronic data and the thus stored document file is managed. Furthermore, a document file is compressed to be submitted with an e-mail. Since an image read with a scanner (hereinafter referred to as a scanned image) has a large file size in general, it is indispensable to compress a scanned image for storage or transmission.

As one compression technique for compressing such an image in a high compression ratio, an image compression technique based on layer segmentation such as Mixed Raster Content (MRC) has been put to practical use. In the image compression technique based on the layer segmentation, a foreground mask corresponding to a text and/or a line drawing is extracted from a color image to be compressed, the color image is separated into a foreground layer and a background layer on the basis of the extracted foreground mask, and the foreground layer and the background layer are respectively compressed by employing suitable compression techniques, so as to ultimately generate a highly compressed image (see Japanese Patent Application Laid-Open No. 2002-94805).

At this point, a foreground layer is a layer of a foreground corresponding to a text and/or a line drawing and is generally compressed by employing a lossless compression technique such as JBIG (Joint Bilevel Image Group), MMR (Modified Modified Read code) or LZW (Lempel Ziv Welch). On the other hand, a background layer is a layer of a background corresponding to an image content other than the text and/or line drawing and is generally compressed by employing a lossy compression technique such as JPEG (Joint Photographic Experts Group). In compression attained by the lossy compression technique, the image quality of a compressed image is more largely degraded than in compression attained by the lossless compression technique. Since the compression ratio is easily controlled in the lossy compression technique, however, priority can be placed on a small file size or high image quality in accordance with the use of a compressed image. On the contrary, since the compression ratio is difficult to control in the lossless compression technique, it is difficult to improve the compression ratio by employing this technique.

In one conventionally proposed image compressing apparatus, a foreground layer separated from a color image is further separated before subjecting it to the lossless compression, and thus, the compression ratio can be improved as compared with the case where the foreground layer is directly subjected to the lossless compression. In this image compressing apparatus, one foreground layer is generated by replacing colors of a foreground of one color image with N (wherein N is a natural number) kinds of identifiers, the generated foreground layer is separated into N binary images respectively corresponding to the N kinds of identifiers, and the separated binary images are individually subjected to the lossless compression.

Alternatively, in another image compressing apparatus conventionally disclosed, a first compression mode suitable for compression of a color image including a small number of colors and a second compression mode suitable for compression of a color image including both a text and a non-text are provided so as to select one of the compression modes manually by a user or automatically by the apparatus itself (see Japanese Patent Application Laid-Open No. 2004-229261). In this image compressing apparatus, a text area and a non-text area of a color image are distinguished from each other in the second compression mode, so as to perform color decreasing processing for converting each pixel of the text area (i.e., a foreground) into an index (identifier) provided correspondingly to a color value (color information).

In the case where the number of colors of the text area is decreased to one through the color decreasing processing (namely, a color image can be changed into a binary image through color decrease), the binary image is subjected to the MMR compression of the lossless compression, and in the case where the number of colors of the text area is decreased to two or more and a prescribed number or less (namely, a color image can be converted into a multilevel image including a smaller number of colors through the color decrease), the multilevel image is subjected to the ZIP compression of the lossless compression. On the other hand, in the case where the number of colors of the text area is not decreased to the prescribed number or less (namely, a color image is converted merely to a multilevel image including a large number of colors through the color decrease), the original color image obtained before the color decreasing processing is subjected to the JPEG compression of the lossy compression.

SUMMARY

In the image compressing apparatus described in Japanese Patent Application Laid-Open No. 2004-229261, however, since the two kinds of lossless compression techniques to be employed depending upon whether the color decreasing processing results in a binary image or a multilevel image as well as the lossy compression technique are employed, a process for controlling these techniques is complicated. Also, when hardware for executing the two kinds of lossless compressions is individually included, the circuit scale of the image compressing apparatus is increased, and it is apprehended that the processing speed may be lowered.

Moreover, the number of colors of a color image is decreased through the color decreasing processing in the image compressing apparatus described in Japanese Patent Application Laid-Open No. 2004-229261, and if the number of colors cannot be decreased to the prescribed number or less through the color decreasing processing, the original color image obtained before the color decreasing processing is subjected to the lossy compression. When a color image obtained before the color decreasing processing is subjected to the lossy compression, the image quality is more largely degraded than through the lossless compression. If the prescribed number is set to a uselessly large value for avoiding the lossy compression, however, it is apprehended that the file size attained after the compression may be uselessly increased. Accordingly, it is preferred that the lossless compression is employed with the number of colors decreased as much as possible.

In the color decreasing processing using indexes, however, for example, after red is allowed to correspond to one index, colors close to red such as reddish purple and reddish brown may be uniformly allowed to correspond to the same index. In this case, this index is allowed to correspond ultimately to an average color of red, reddish purple and reddish brown as a representative color. As a result, particularly when the prescribed number of colors is largely smaller than the number of colors of a text area of a color image, an excessively large range of colors is unified to correspond to one index, and therefore, it is apprehended that the image quality of a compressed image may be degraded.

In order to solve such a problem, the color decreasing processing is performed with one index allowed to correspond to a small range of colors, and when the number of colors resulting from the decrease is larger than the prescribed number, the color decreasing processing may be repeatedly performed with the range of colors to be corresponded gradually increased until the number of colors is decreased to the prescribed number or less. In this case, however, the same color decreasing processing should be repeatedly executed, and hence, there arises a problem that the performance of the processing is lowered.

Since there is a conflicting relationship between high image quality of a compressed image and a small file size in general, the priority is placed on high image quality or a small file size in the compression. However, it is preferred that high image quality and a small file size are compatible with each other, so that useless increase of a file size can be avoided even when the priority is placed on high image quality or so that the image quality can be prevented from being extremely degraded even when the priority is placed on a small file size.

The present invention has been devised in consideration of the aforementioned circumstances, and a principal object is providing an image compressing method, an image compressing apparatus and an image forming apparatus in which high image quality of a compressed image and a small file size are compatible with each other without repeatedly executing the same color decreasing processing but by employing one kind of lossless compression technique and one kind of lossy compression technique. Specifically, in the compression of the present invention, N kinds of foreground identifiers used for identifying color information of respective pixels of a foreground is reduced to M kinds fewer than the N kinds on the basis of the number of pixels having the foreground identifiers, M binary images are generated correspondingly to the M kinds of identifiers on the basis of a foreground layer including the M kinds of foreground identifiers, and the respective binary images are subjected to the lossless compression, and a background layer is subjected to the lossy compression.

The image compressing apparatus of the invention for compressing a color image, includes a foreground mask generating means for generating, on the basis of the color image, a foreground mask including pixels of a foreground corresponding to a text and/or a line drawing included in the color image; a foreground layer generating means for generating, on the basis of the foreground mask generated by the foreground mask generating means and the color image, a foreground layer by replacing color information of respective pixels of the foreground with N (wherein N is a natural number) kinds of foreground identifiers for identifying color information included in the foreground and by replacing color information of each pixel of a background with a background identifier indicating the background; a table generating means for generating a table in which color information included in the foreground, a foreground identifier for identifying the color information and the number of pixels having the foreground identifier are correlated and stored with one another; a reduction determining means for determining whether or not the number of kinds of foreground identifiers is to be reduced to be smaller than N; a table replacing means for reducing, when the reduction determining means determines that the number of kinds of foreground identifiers is to be reduced, the number of kinds of foreground identifiers to M (wherein M is a natural number smaller than N) by replacing one kind or a plurality of kinds of foreground identifiers included in the table with the background identifier on the basis of the numbers of pixels stored in the table generated by the table generating means; a foreground layer correcting means for correcting, on the basis of the table in which the foreground identifier has been replaced with the background identifier by the table replacing means, the foreground layer to a corrected foreground layer by replacing the foreground identifier included in the foreground layer generated by the foreground layer generating means with the background identifier; a binary image generating means for generating, on the basis of the foreground layer corrected by the foreground layer correcting means, M binary images, each of which is obtained by binarizing a pixel value of one kind of foreground identifier and pixel values of the other kinds of foreground identifiers, respectively corresponding to the M kinds of foreground identifiers; a binary image compressing means for performing lossless compression on the M binary images generated by the binary image generating means; a background generating means for generating a background layer on the basis of the foreground layer corrected by the foreground layer correcting means and the color image; and a background image compressing means for performing lossy compression on the background layer generated by the background generating means.

According to the present invention, a color image is separated into a foreground layer and a background layer, and the foreground layer and the background layer obtained by the separation are respectively compressed. The foreground mask generating means generates a foreground mask on the basis of the color image. The generated foreground mask represents pixels of a foreground corresponding to a text and/or a line drawing included in the color image.

The foreground layer generating means generates a foreground layer on the basis of the foreground mask generated by the foreground mask generating means and the color image. In the generated foreground layer, color information of respective pixels of a foreground of the color image is replaced with N kinds of foreground identifiers for identifying the color information of the foreground, and color information of each pixel of a background of the color image is replaced with a background identifier indicating the background. At this point, N is a natural number. As a result, in the foreground layer generated by the foreground layer generating means, a pixel having a foreground identifier corresponds to the foreground of the color image and a pixel having a background identifier corresponds to the background of the color image.

The table generating means generates a table. In the generated table, color information included in the foreground of the color image, a foreground identifier for identifying the color information and the number of pixels having the foreground identifier are correlated and stored with one another. In general, one kind of foreground identifier may be allowed to correlate to one kind of color information included in a foreground or allowed to correlate to color information of a representative color representing a plurality of kinds of color information included in the foreground.

The reduction determining means determines whether or not the number of kinds of foreground identifiers is to be reduced to be smaller than N. In this case, when priority is placed on, for example, a small file size of a compressed image obtained after the compression over high image quality of the compressed image, the number of kinds of foreground identifiers is preferably small, and therefore, the reduction determining means determines to reduce the number. Alternatively, when the number of kinds of foreground identifiers is, for example, larger than a prescribed number, the reduction determining means determines to reduce the number for making the number of kinds of foreground identifiers close to the prescribed number.

When the reduction determining means determines to reduce the number of kinds of foreground identifiers, the table replacing means reduces the number of kinds of foreground identifiers to M. At this point, M is a natural number smaller than N. Specifically, the table replacing means replaces one kind or a plurality of kinds of foreground identifiers included in the table generated by the table generating means with a background identifier on the basis of the numbers of pixels stored in the table. When a foreground identifier to be replaced with the background identifier is determined on the basis of the numbers of pixels, it should be determined so that degradation of the image quality attained after the compression can be suppressed as much as possible. Accordingly, a foreground identifier corresponding to pixels in small number is preferably replaced with the background identifier.

The foreground layer correcting means corrects the foreground layer generated by the foreground layer generating means on the basis of the table in which the foreground identifier has been placed with the background identifier by the table replacing means. Specifically, the foreground layer correcting means replaces the foreground identifier included in the foreground layer generated by the foreground layer generating means with the background identifier. In the correction processing performed by the foreground layer correcting means, a pixel not largely affecting the image quality out of the foreground pixels is regarded as a background pixel in a manner of speaking. As a result, in the foreground layer having been corrected by the foreground layer correcting means, pixels having the foreground identifiers correspond to a part of the foreground of the color image and pixels having the background identifier correspond to the background of the color image and the other part of the foreground having been regarded as the background.

The binary image generating means generates M binary images respectively corresponding to the M kinds of foreground identifiers on the basis of the foreground layer having been corrected by the foreground layer correcting means. Each binary image is obtained by binarizing a pixel value of one kind of foreground identifier and pixel values of the other foreground identifiers. The binary image compressing means performs lossless compression on the M binary images generated by the binary image generating means. The data quantity of the M binary images having been lossless compressed (namely, the M lossless compressed images) is smaller than that of N binary images, and therefore, the resultant file size can be thus made smaller. In addition, since the M lossless compressed images include information of pixels largely affecting the image quality, the degradation of the image quality attained after the compression can be suppressed.

The background generating means generates a background layer on the basis of the foreground layer having been corrected by the foreground layer correcting means and the color image. Conventionally, a general background layer is generated on the basis of a foreground mask and a color image, and the foreground mask generated by the foreground mask generating means is not affected by the replacement of the identifiers performed by the table replacing means. Also, if the foreground mask generated by the foreground mask generating means is affected by the replacement of the identifiers performed by the table replacing means, the processing becomes complicated. In other words, since the background layer is generated on the basis of the foreground layer having been corrected by the foreground layer correcting means, the background layer can be easily made to be affected by the replacement of the identifiers performed by the table replacing means.

The background image compressing means performs lossy compression on the background layer generated by the background generating means. As a result, even when a part of a text corresponding to the foreground is dealt with as the background to be lossy compressed, it can be suppressed to become illegible.

The image compressing apparatus of this invention further includes a selecting means for selecting either a first compression mode in which priority is placed on a small file size of a compressed image obtained after compression over high image quality of the compressed image or a second compression mode in which priority is placed on high image quality of the compressed image over a small file size of the compressed image, and the reduction determining means determines whether or not the number of kinds of foreground identifiers is to be reduced to be smaller than N in accordance with the first or second compression mode selected by the selecting means.

The selecting means selects either of the first compression mode or the second compression mode. The selection made by the selecting means may be made manually by a user or automatically by the image compressing apparatus itself in accordance with, for example, the contents of the color image. The reduction determining means determines whether or not the number of kinds of foreground identifiers is to be reduced to be smaller than N in accordance with the compression mode selected by the selecting means. For example, when the first compression mode is set by the selecting means, it determines that the number of kinds of foreground identifiers is reduced unconditionally, and when the second compression mode is set by the selecting means, it determines that the number of kinds of foreground identifiers is reduced under a given condition. Accordingly, the color image can be appropriately compressed in accordance with a necessary level of the image quality and a desired file size.

In the image compressing apparatus of this invention, when the first compression mode in which priority is placed on a small file size of a compressed image is selected by the selecting means, the reduction determining means determines to reduce the number of kinds of foreground identifiers to be smaller than N, and the table replacing means replaces a foreground identifier corresponding to pixels in number smaller than a prescribed number of pixels with the background identifier among pixels stored in the table generated by the table generating means. Thus, the number of kinds of foreground identifiers is reduced to M.

As a result, the number of foreground pixels included in the foreground layer corrected by the foreground layer correcting means is smaller than the number of foreground pixels included in the foreground layer generated by the foreground layer generating means. Thereafter, binary images obtained by further separating the foreground layer having been corrected by the foreground layer correcting means are lossless compressed. However, if the number M of kinds of foreground identifiers is reduced to one, the foreground layer is not separated but the foreground layer itself is binarized into a binary image to be lossless compressed.

Although the compression efficiency is poorer in the lossless compression than in the lossy compression, since the total number of foreground pixels and the number of kinds of foreground identifiers included in the foreground layer to be compressed by the lossless compression have been reduced to the utmost limit, the file size attained after the compression can be smaller than in the case where the color image is compressed in the second compression mode where the priority is placed on high image quality attained after the compression. Also, a foreground identifier is not randomly replaced with the background identifier but a foreground identifier corresponding to pixels in number smaller than the prescribed number of pixels is replaced with the background identifier. Therefore, large degradation of the image quality of a compressed image otherwise caused by regarding a part of the foreground as the background can be suppressed. In other words, high image quality and a small file size can be compatible with each other.

In the image compressing apparatus of this invention, in the case where the second compression mode where the priority is placed on high image quality attained after the compression is selected by the selecting means, the reduction determining means determines to reduce the number of kinds of foreground identifiers to be smaller than N when the number N of kinds of foreground identifiers is larger than a prescribed number P (wherein P is a natural number), and the table replacing means replaces, under a condition that the number M resulting from the reduction is not less than the prescribed number P, a foreground identifier corresponding to pixels in number smaller than a prescribed number with the background identifier successively in the ascending order of the number of pixels among pixels stored in the table generated by the table generating means. The prescribed number of pixels may be the same as or different from the prescribed number of pixels employed in the first compression mode.

In the case where the number N of kinds of foreground identifiers is not more than the prescribed number P, the foreground layer is not corrected by the foreground layer correcting means. Accordingly, the degradation of the image quality otherwise caused through compression with a part of the foreground regarded as the background is avoided. In other words, the priority is placed on high image quality. In addition, since the number N of kinds of foreground identifiers is not more than the prescribed number P, when binary images generated through further separation of the foreground layer generated by the foreground layer generating means are lossless compressed, a file size attained after the compression is not excessively large. In other words, the high image quality and a small file size can be compatible with each other.

On the other hand, in the case where the number N of kinds of foreground identifiers is larger than the prescribed number P, the number M of kinds of foreground identifiers included in the foreground layer having been corrected by the foreground layer correcting means is smaller than the number N of kinds of foreground identifiers included in the foreground layer generated by the foreground layer generating means. Thereafter, binary images generated through further separation of the corrected foreground layer corrected by the foreground layer correcting means are lossless compressed. Although the compression efficiency is poorer in the lossless compression than in the lossy compression, the number of kinds of foreground identifiers included in the foreground layer to be subjected to the lossless compression has been reduced to the utmost limit, and therefore, the file size attained after the compression can be made smaller than that attained, for example, when binary images obtained through further separation of the foreground layer generated by the foreground layer generating means are lossless compressed.

Furthermore, a foreground identifier is not randomly replaced with the background identifier but a foreground identifier corresponding to pixels in number smaller than the prescribed number of pixels is replaced with the background identifier. Therefore, large degradation of the image quality of a compressed image otherwise caused by regarding a part of the foreground as the background can be suppressed. In other words, high image quality and a small file size can be compatible with each other.

In the image compressing apparatus of this invention, in the case where the second compression mode where the priority is placed on high image quality attained after the compression is selected by the selecting means, the reduction determining means determines to reduce the number of kinds of foreground identifiers to be smaller than N when the number N of kinds of foreground identifiers is larger than the prescribed number P and is not more than a prescribed number Q (wherein Q is a natural number larger than P) (i.e., when $P<N\leqq Q$).

When the number N of kinds of foreground identifiers is larger than the prescribed number Q (namely, when N>Q), it is apprehended that the image quality attained after the compression may be largely degraded through compression with a part of the foreground regarded as the background. Accordingly, when N>Q, the foreground layer is not corrected by the foreground layer correcting means. In other words, the priority is placed on high image quality.

In the image compressing apparatus of this invention, when the reduction determining means determines not to reduce the number of kinds of foreground identifiers to be smaller than N and the number N of kinds of foreground identifiers stored in the table generated by the table generating means is larger than the prescribed number P, or when the reduction determining means determines to reduce the number and the number M resulting from the reduction by the table replacing means is larger than the prescribed number P, the foreground layer correcting means corrects the foreground layer generated by the foreground layer generating means to a corrected foreground layer by replacing all foreground identifiers included in the generated foreground layer with the background identifier; generation of the binary image by the binary image generating means and compression by the binary image compressing means are not carried out; and the background image compressing means performs, on the background layer generated by the background generating means, prescribed image processing for enhancing an image included in the background layer before performing the lossy compression.

When the reduction determining means determines not to reduce the number and the number N of kinds of foreground identifiers is larger than the prescribed number P, if the number of kinds of foreground identifiers is reduced, it is apprehended that the image quality may be largely degraded. On the other hand, when N binary images respectively corresponding to the N kinds of foreground identifiers are generated on the basis of the foreground layer generated by the foreground layer generating means and the binary images are lossless compressed, it is apprehended that a file size attained after the compression may be excessively large. Accordingly, the color image itself is subjected to the lossy compression without separating the color image into binary images of a foreground layer and a background layer to be respectively subjected to the lossless compression and the lossy compression.

Furthermore, when the reduction determining means determines to reduce the number and the number M of kinds of foreground identifiers is larger than the prescribed number P, if the number of kinds of foreground identifiers is further reduced, it is apprehended that the image quality may be largely degraded. On the other hand, when M binary images respectively corresponding to the M kinds of foreground identifiers are generated on the basis of the foreground layer corrected by the foreground layer correcting means and the binary images are lossless compressed, it is apprehended that a file size attained after the compression may be excessively large. Accordingly, the color image itself is subjected to the lossy compression without separating the color image into binary images of a foreground layer and a background layer to be respectively subjected to the lossless compression and the lossy compression.

For this purpose, the foreground layer correcting means corrects the foreground layer generated by the foreground layer generating means to a corrected foreground layer by replacing all foreground identifiers included in the generated foreground layer with the background identifiers. In other words, the whole foreground is regarded as the background. In this case, the corrected foreground layer is meaningless because it includes none of the contents of the color image, and therefore, the generation of binary images by the binary image generating means and the compression of the binary images by the binary image compressing means are not executed. In other words, a lossless compressed image obtained from the foreground layer is not outputted. The background image compressing means performs the lossy compression on the background layer generated by the background generating means. The background layer generated by the background generating means on the basis of the foreground layer including the background identifier alone corresponds to the color image itself. In other words, the color image obtained before performing the color decreasing processing is subjected to the lossy compression.

However, prescribed image processing is performed on the background layer before performing the lossy compression of the background layer. In other words, the background image compressing means does not directly perform the lossy compression on the background layer but performs, for example, edge processing, contrast enhancement processing or the like for emphasizing an image included in the background layer before performing the lossy compression. As a result, the degradation of the image quality (for example, a text corresponding to the foreground becoming illegible) can be suppressed. Since the background layer is generally subjected to resolution lowering processing, the file size attained after the compression can be made smaller in this case than in the case where the color image itself is directly subjected to the lossy compression.

The image compressing apparatus of this invention further includes a pixel number determining means for determining the prescribed number of pixels in accordance with a document size of the color image or information of a foreground included in the foreground layer generated by the foreground layer generating means.

The pixel number determining means determines the prescribed number of pixels, that is, a condition employed in replacing a foreground identifier with the background identifier. The prescribed number of pixels is determined in accordance with the document size of the color image or information of the foreground included in the foreground layer generated by the foreground layer generating means. The information of the foreground is, for example, the number of foreground pixels or the rectangle size of the foreground. As a result, similar foreground colors (colors of texts in particular) can be reproduced through compression of color images having the same color arrangement but different document sizes or color images different in the number of foreground identifiers or the rectangle size of the foreground. If the prescribed number of pixels is determined inappropriately, there may arise a problem that the foreground is reproduced in one of two color images decompressed after the compression but is inaccurately reproduced in the other.

In the image compressing apparatus of this invention, in the case where the reduction determining means determines not to reduce the number of kinds of foreground identifiers, the binary image generating means generates, on the basis of the foreground layer generated by the foreground layer generating means, N binary images, each of which is obtained by binarizing a pixel value of one kind of foreground identifier and pixel values of the other kinds of foreground identifiers, respectively corresponding to the N kinds of foreground identifiers; the binary image compressing means performs the lossless compression on each of the N binary images generated by the binary image generating means; and the background generating means generates the background layer on the basis of the foreground layer generated by the foreground layer generating means and the color image.

When the reduction determining means determines not to reduce the number, the binary images of the foreground layer and the background layer are respectively subjected to the lossless compression and the lossy compression. The case where the reduction determining means determines not to reduce the number of kinds of foreground identifiers corresponds to a case where high image quality and a small file size are compatible with each other without reducing the number of kinds of foreground identifiers, and in such a case, it is apprehended that the image quality may be largely degraded if the number of kinds of foreground identifiers is further reduced. Accordingly, the replacement of the identifiers by the table replacing means and the correction of the foreground layer by the foreground layer correcting means are not executed.

Therefore, the binary image generating means generates N binary images respectively corresponding to the N kinds of foreground identifiers on the basis of the foreground layer generated by the foreground layer generating means. Each of the binary images is obtained by binarizing a pixel value of one kind of foreground identifier and pixel values of the other kinds of the foreground identifiers. The binary image compressing means performs the lossless compression on the N binary images generated by the binary image generating means.

The background generating means generates the background layer on the basis of the foreground layer generated by the foreground layer generating means and the color image. Subsequently, the background image compressing means performs the lossy compression on the background layer generated by the background generating means. Conventionally, a general background layer is generated on the basis of a foreground mask and a color image. If a background layer is generated based on a foreground mask as in the conventional technique when the number of kinds of foreground identifiers is not reduced and is generated based on a foreground layer when the number of kinds of identifiers is reduced, the processing for generating a background layer is complicated.

The image forming apparatus of this invention includes the aforementioned image compressing apparatus and an image forming means for forming an image on a recording sheet.

According to the aforementioned image compressing apparatus, high image quality and a small file size are compatible with each other, so that useless increase of a file size can be avoided even when the priority is placed on high image quality or so that the image quality can be prevented from being extremely degraded even when the priority is placed on a small file size. Therefore, the image compressing apparatus can, for example, store compressed images with small file size or form a high quality color image obtained by decompressing a compressed image on a recording sheet.

The computer program of this invention can allow the foreground mask generating means, the foreground layer generating means, the table generating means and the like of the aforementioned image compressing apparatus to be realized in the form of software by using hardware elements of a computer. Furthermore, the image compressing process performed by the aforementioned image compressing apparatus may be realized to be incorporated into a program of a series of image processing.

The recording medium of this invention records a computer program for realizing the foreground mask generating means, the foreground layer generating means, the table generating means and the like of the aforementioned image compressing apparatus in the form of software by using hardware elements of a computer. The recording medium of this invention may record an image processing program into which the image compression process performed by the aforementioned image compressing apparatus is incorporated. Furthermore, according to the recording medium of this invention, convenience in distribution, storage and the like of a computer program for allowing a computer to function as the aforementioned image compressing apparatus can be improved.

According to the present invention, binary images obtained by further separating a foreground layer are subjected to the lossless compression regardless of the number of kinds of foreground identifiers included in the foreground layer, namely, regardless of the number of colors included in the foreground, and hence, there is no need to include a plurality of kinds of lossless compression techniques. Furthermore, there is no need to include a plurality of kinds of lossy compression techniques. Therefore, one kind of lossless compression technique and one kind of lossy compression technique can be controlled through simple processing. Moreover, when the compression is executed in the form of hardware, the image compressing apparatus includes merely one kind of hardware for executing the lossless compression and one kind of hardware for executing the lossy compression. Accordingly, the circuit scale of the image compressing apparatus can be made compact as compared with the case where a plurality of kinds of hardware are included, and the processing speed can be improved.

The foreground layer generating processing for generating a foreground layer corresponds to the conventional color decreasing processing using indexes. In the case where the number of kinds of foreground identifiers cannot be reduced to a prescribed number or less (namely, the number of colors of a foreground cannot be reduced to a prescribed number or less of colors) through the foreground layer generating processing, the color image obtained before performing the color decreasing processing is directly subjected to the lossy compression in the conventional technique. In contrast, according to the present invention, the number of kinds of foreground identifiers is reduced. Therefore, there is a strong probability that binary images are subjected to the lossless compression with the number of colors reduced as much as possible. Since the processing for reducing the number of kinds of foreground identifiers is performed on the basis of the numbers of pixels corresponding to the foreground identifiers, there is no need to repeatedly perform the color decreasing processing with the range of colors to be corresponded to one kind of foreground identifier gradually increased. In other words, there is no need to repeatedly execute the same color decreasing processing. Accordingly, the performance of the processing can be improved.

Furthermore, since the processing for reducing the number of kinds of foreground identifiers is executed after generating the foreground layer, there is no need to set the range of colors to be corresponded to one kind of foreground identifier excessively wide at the stage of generating a foreground layer for reducing the number of kinds of foreground identifiers. In other words, unification of an excessively large range of colors to one kind of foreground identifier can be suppressed. Accordingly, degradation of the image quality attained after the compression can be suppressed. Furthermore, there is no need to uselessly increase the number of kinds of foreground identifiers at the stage of generating a foreground layer for suppressing the degradation of the image quality attained after the compression. Accordingly, increase of a file size attained after the compression can be suppressed.

As a result, according to the present invention, high image quality and a small file size are compatible with each other, so that useless increase of a file size can be avoided even when the priority is placed on high image quality or so that the image quality can be prevented from being extremely degraded even when the priority is placed on a small file size.

The above and further objects and features of the invention will more fully be apparent from the following detailed description with accompanying drawings.

BRIEF DESCRIPTION OF THE SEVERAL VIEWS OF THE DRAWINGS

FIG. 5 is a schematic diagram explaining respective compression modes employed in the image compressing apparatus of Embodiment 1;

FIG. 8 is a schematic diagram of an exemplary generated index color table generated in the image compressing apparatus of Embodiment 1;

FIG. 18 is a schematic diagram of exemplary pixel values of a binary image corresponding to a foreground identifier "5" generated in the image compressing apparatus of Embodiment 1;

FIG. 23 is a flowchart illustrating procedures in the color image compression process executed in the image compressing apparatus of Embodiment 3; and.

DETAILED DESCRIPTION

The present invention will now be described in detail with reference to the accompanying drawings illustrating preferred embodiments.

Embodiment 1

Figure 1:
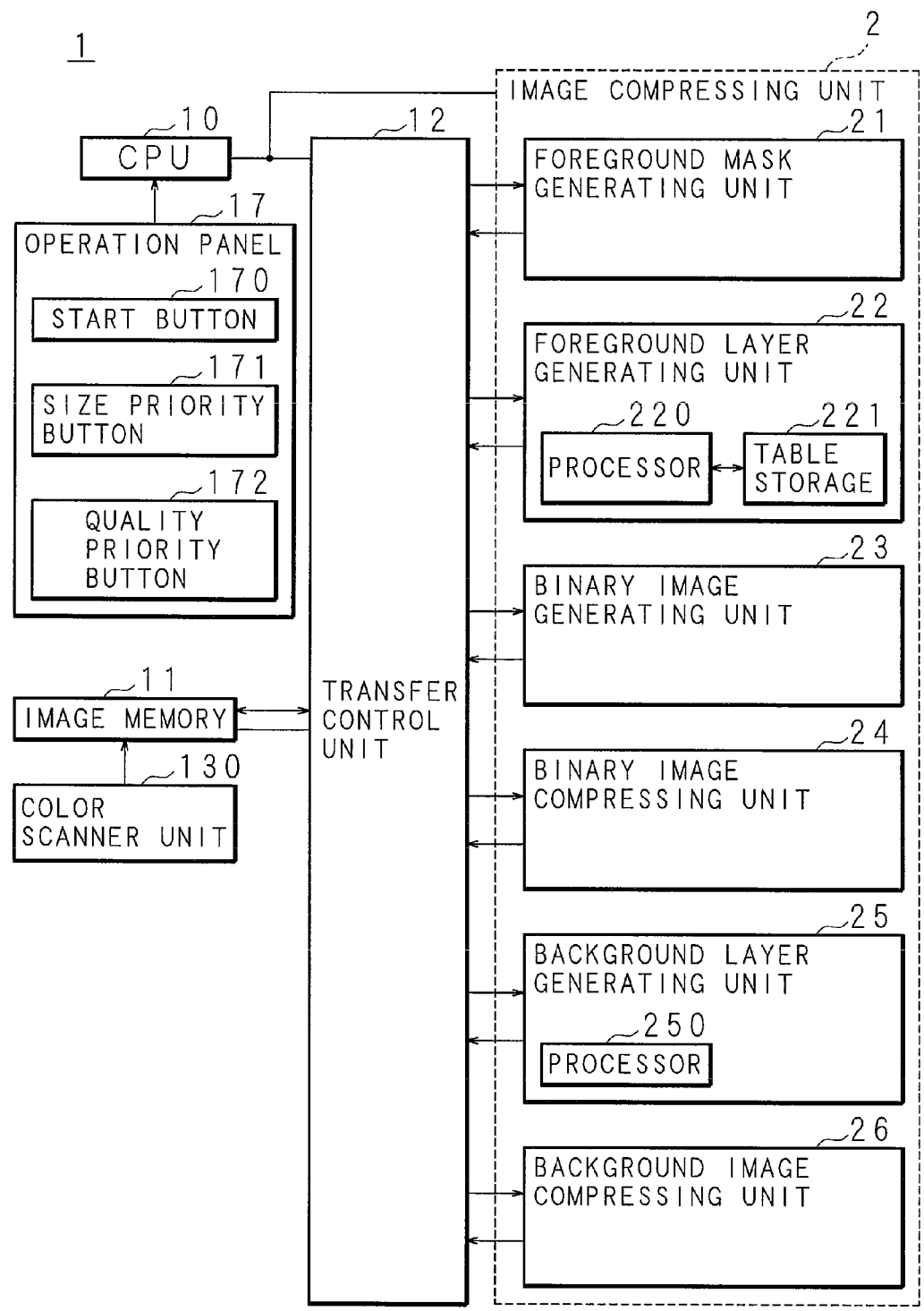
FIG. 1 is a block diagram illustrating the configuration of a principal part of an image compressing apparatus according to Embodiment 1.

FIG. 1 is a block diagram illustrating the configuration of a principal part of an image compressing apparatus according to Embodiment 1. In FIG. 1, a reference numeral 1 denotes an image compressing apparatus, and the image compressing apparatus 1 performs a color image compression process for compressing a color image inputted to the image compressing apparatus 1. A color image is generally separated into a foreground layer and a background layer, the foreground layer is further separated into binary images, the respective binary images are subjected to lossless compression, the background layer is subjected to lossy compression, and the thus obtained lossless compressed images and lossy compressed image and information to be used for decompressing these images are brought into one file (hereinafter referred to as a compression file). As the information to be used for decompressing a lossless compressed image, an index color table (hereinafter referred to as an IC table) is used.

The image compressing apparatus 1 includes, as illustrated in FIG. 1, a CPU (Central Processing Unit) 10, an image memory 11, a transfer control unit 12 and an image compressing unit 2, and is connected to a color scanner unit 130 of a color image inputting device and to an operation panel 17. The image compressing unit 2 includes a foreground mask generating unit 21, a foreground layer generating unit 22, a binary image generating unit 23, a binary image compressing unit 24, a background layer generating unit 25 and a background image compressing unit 26. Furthermore, the foreground layer generating unit 22 includes a processor 220 for executing various operations and a table storage 221 composed of registers, a RAM or the like. Moreover, the background layer generating unit 25 includes a processor 250 for executing various operations.

The CPU 10 works as a control center of the image compressing apparatus 1, and supplies, to respective components of the image compressing unit 2, various control signals corresponding to, for example, transfer timing at which transfer of a color image, a foreground mask or the like is to be requested, an address at which a color image, a foreground mask or the like is to be read/written in/from the image memory 11, generation timing at which generation of a foreground mask, a foreground layer or the like is to be started, compression timing at which compression of a binary image is to be started, various settings in accordance with a compression mode, and a prescribed number K (wherein K is a natural number) of pixels in accordance with the size of a color image.

The image memory 11 includes, for example, a DDR2 SDRAM (Double-Data-Rate 2 Synchronous Dynamic Random Access Memory) or a hard disk. A color image supplied to the image compressing apparatus 1, a foreground mask, a foreground layer, a background layer, a binary image, a lossless compressed image and a lossy compressed image outputted from the image compressing unit 2 and various data or the like outputted from various components not shown of the apparatus are written in or read from the image memory 11.

The transfer control unit 12 executes, in response to a transfer request inputted to the transfer control unit 12, transfer processing for a color image, a foreground mask; a foreground layer, a binary image, a lossless compressed image, a lossy compressed image and various data, and when a plurality of transfer requests are inputted simultaneously, it determines the priorities of the inputted transfer requests so as to execute the transfer processing successively in the priority order. The priorities of transfer requests are set in the transfer control unit 12 at appropriate timing by the CPU 10 or set in the transfer control unit 12 as the default. The color scanner unit 130 reads a reflected light image from a document by using a CCD (Charge Coupled Device) as a color image with RGB (Red Green Blue) values.

The operation panel 17 includes an operation portion having setting buttons, ten keys or the like used for setting an operation mode of the image compressing apparatus 1, and a display portion including a liquid crystal display or the like. Specifically, the operation panel 17 includes a start button 170, a size priority button 171 and a quality priority button 172 as hard keys or soft keys disposed on a touch panel.

The start button 170 is pushed when each of various operations (such as an operation for reading a document with the color scanner unit 130) is to be started. The size priority button 171 is pushed for selecting a first compression mode in which the priority is placed on a small file size over high image quality of a compressed image (hereinafter referred to a size priority compression mode). The quality priority button 172 is pushed for selecting a second compression mode in which the priority is placed on high image quality over a small file size attained after the compression (hereinafter referred to as a quality priority compression mode).

Figure 2:
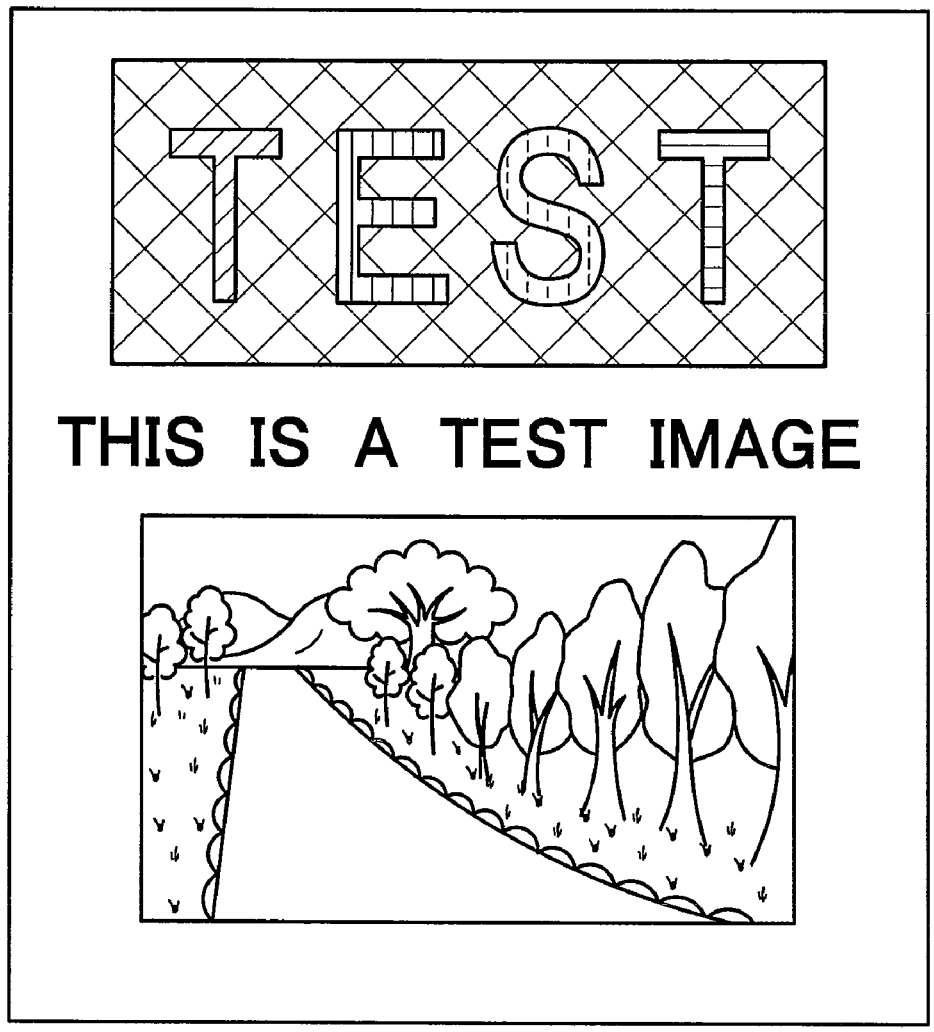
FIG. 2 is a schematic diagram of an exemplary color image to be subjected to a color image compression process by the image compressing apparatus of Embodiment 1.
Figure 3:
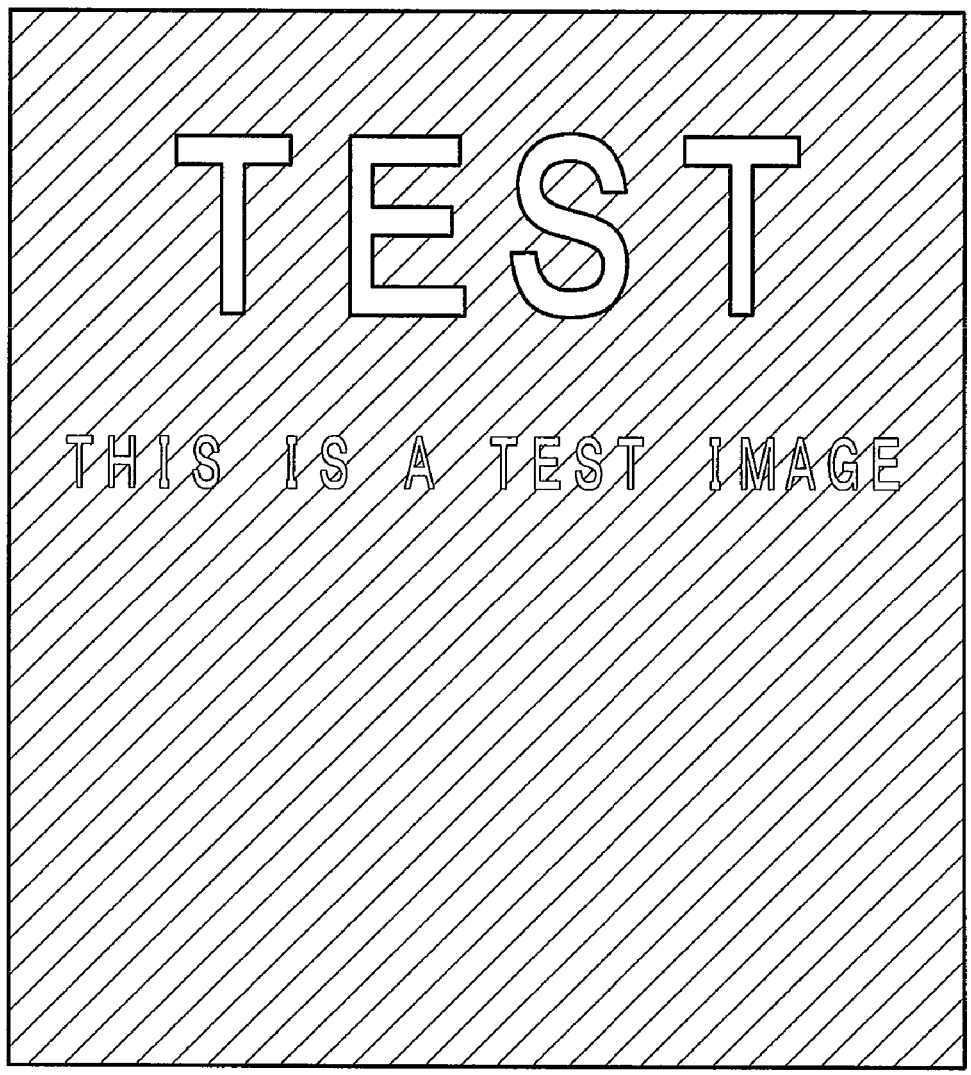
FIG. 3 is a schematic diagram of an exemplary foreground mask generated in the image compressing apparatus of Embodiment 1.
Figure 4B:
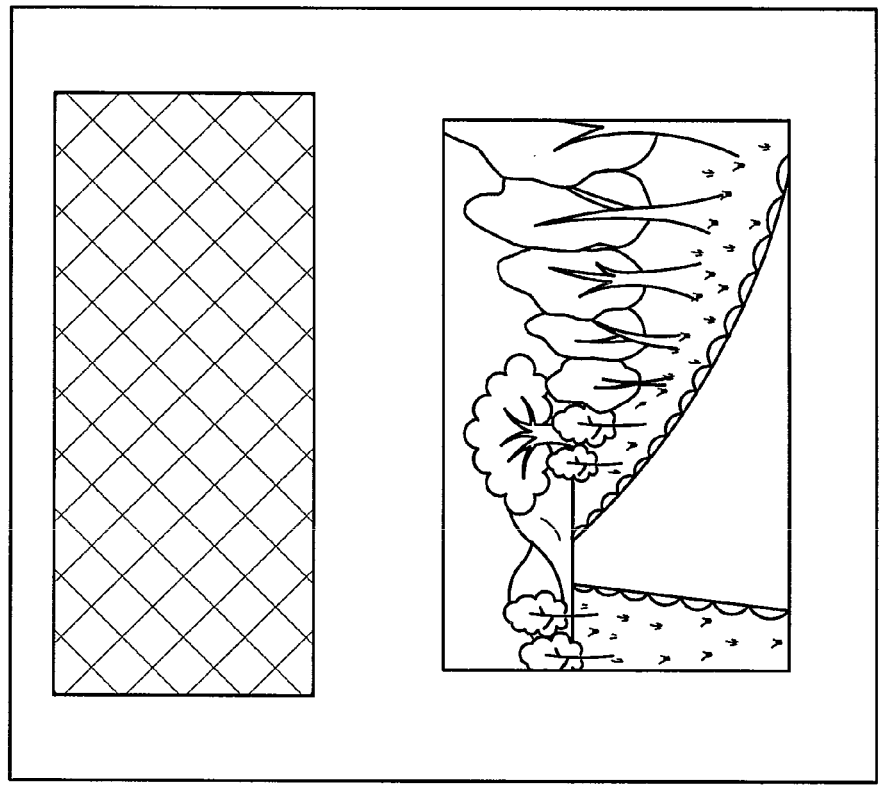
FIG. 4B is a schematic diagram of an exemplary background layer generated in the image compressing apparatus of Embodiment 1.

FIG. 2 is a schematic diagram illustrating an exemplary color image to be subjected to the color image compression process by the image compressing apparatus 1. FIG. 3 is a schematic diagram illustrating an exemplary foreground mask generated in the image compressing apparatus 1, and FIGS. 4A and 4B are schematic diagrams illustrating exemplary foreground layer and background layer generated in the image compressing apparatus 1.

FIG. 2 illustrates an exemplary color image. The color image of FIG. 2 is formed on a white recording sheet with color inks or color toners of black, red, green, blue, violet, light blue and the like. The color image includes thick characters of "TEST" respectively colored with light blue, red, violet and blue and drawn in a rectangular area filled in with green; a sentence of small characters of "This is a test image." colored with black on the white ground; and a colorful landscape picture. Among these components, the word "TEST" and the sentence "This is a test image." correspond to a foreground, and the rest corresponds to a background. In other words, the area filled in with green, the landscape picture and the white ground are all the background. Pixels included such a color image have, as pixel values, multivalued color information for directly expressing a plurality of colors (of, for example, 256 colors).

FIG. 3 exemplarily illustrates one foreground mask generated on the basis of the color image illustrated in FIG. 2. In a foreground mask, a foreground pixel and a background pixel have different pixel values. In the foreground mask illustrated in FIG. 3, the foreground is expressed with white alone and the background is expressed with black (hatched in the drawing) alone. Pixels of such a foreground mask have binary pixel values, and specifically, each pixel of the foreground has a pixel value of "0" and each pixel of the background has a pixel value of "1". Accordingly, in the foreground mask, it is easy to find a pixel with a pixel value of "0" as a foreground pixel and a pixel with a pixel value of "1" as a background pixel.

Figure 4A:
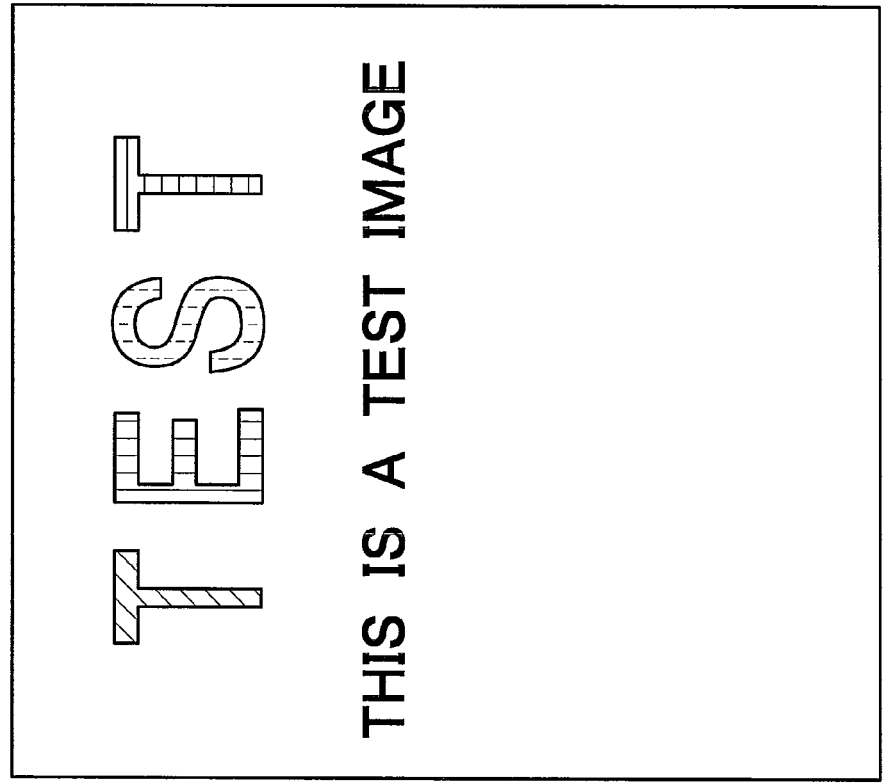
FIG. 4A is a schematic diagram of an exemplary foreground layer generated in the image compressing apparatus of Embodiment 1.

FIG. 4A exemplarily illustrates one foreground layer generated on the basis of the color image illustrated in FIG. 2 and the foreground mask illustrated in FIG. 3. In a foreground layer, a foreground is expressed with colors of the foreground of the color image, and a background is expressed with colors other than the colors of the foreground. In the foreground layer of FIG. 4A, as the foreground, the word "TEST" is expressed with light blue, red, violet and blue, and the sentence "This is a test image." is expressed with black alone. On the other hand, the background is expressed with white alone. It is noted that pixels of a foreground layer have, as pixel values, identifiers for indirectly expressing a small number of colors while pixels of a color image have, as pixel values, color information for directly expressing a large number of colors.

For example, respective pixels of a foreground layer have multivalued identifiers for expressing eight colors, which is smaller in number than the 256 colors of a color image. Each of eight kinds of identifiers respectively expressing the eight colors can be indicated as a pixel value having a data length of 3 bits. On the other hand, each of 256 kinds of color information for respectively expressing the 256 colors can be indicated as a pixel value having a data length of 8 bits. Therefore, a foreground layer is smaller in data quantity than a color image.

In more detail, in a foreground layer, each foreground pixel has, as a pixel value, one of N kinds of identifiers, and each background pixel has, as a pixel value, one identifier different from all the N kinds of identifiers. At this point, N is a natural number, and N≦2 in general but N may be 1. An identifier and color information are stored in an IC table (see FIG. 8 described below) in a one-to-one correlation. An IC table is generated simultaneously with a foreground layer on the basis of a color image and a foreground mask.

In the following description, an identifier used for identifying color information included in a foreground is designated as a foreground identifier, an identifier used for distinguishing a background from a foreground is designated as a background identifier, and a word "an identifier" is simply used when there is no need to distinguish a foreground identifier and a background identifier.

In the case where a foreground of a color image includes a small number of colors, color information in correlation to N kinds of foreground identifiers is color information of N colors included in the foreground of the color image. On the other hand, in the case where a foreground of a color image includes a large number of colors, color information in correlation to each of N kinds of foreground identifiers is color information of one color included in the foreground of the color image or color information of a representative color obtained by unifying a plurality of colors included in the foreground of the color image. For example, color information corresponding to a color of "R, G, B=255, 0, 0" is allowed to correlate to one kind of foreground identifier, or a color of "R, G, B=255, 0, 0", a color of "R, G, B=255, 51, 0" and a color of "R, G, B=255, 0, 51" are unified as a representative color of "R, G, B=255, 17, 17" and color information of the representative color is allowed to correlate to one kind of foreground identifier.

In the following description, it is assumed that white is allowed to correlate to an identifier "0", that green is allowed to correlate to an identifier "1", that light blue is allowed to correlate to an identifier "2", that red is allowed to correlate to an identifier "3", that violet is allowed to correlate to an identifier "4", that blue is allowed to correlate to an identifier "5", etc., that black is allowed to correlate to an identifier "7", that a background identifier is "0" and that foreground identifiers are "1" through "7". Accordingly, in the foreground layer illustrated in FIG. 4A, a pixel of the foreground layer corresponding to a pixel of the foreground having color information of light blue in the color image of FIG. 2 has the foreground identifier "2". Similarly, pixels of the foreground layer corresponding to pixels of the foreground respectively having color information of red, violet, blue and black in the color image have the identifiers of "3", "4", "5" and "7", respectively. On the other hand, each pixel of the foreground layer corresponding to a pixel of the background of the color image has the background identifier "0" as a pixel value.

In this embodiment, the ultimate number of kinds of foreground identifiers is suppressed to a prescribed number P (wherein P is a natural number) or less for suppressing a problem that a file size attained after the compression is excessively large. At the time of generating a foreground layer (namely, at the time of generating an IC table), however, the number N of kinds of foreground identifiers may exceed the prescribed number P. In other words, the image compressing apparatus 1 does not employ a structure in which the number of kinds of foreground identifiers is restricted in generating an IC table and a foreground layer on the basis of a color image.

FIG. 5 is a schematic diagram explaining the respective compression modes (i.e., the size priority compression mode and the quality priority compression mode).

The size priority compression mode will be described first.

In the size priority compression mode, after generating a foreground layer, an IC table is corrected so as to reduce the number N of kinds of foreground identifiers to M (wherein M is a natural number smaller than N) no matter whether the number N of kinds of the foreground identifiers is large or small. For this purpose, a foreground identifier corresponding to pixels in number smaller than a prescribed number K is replaced with a background identifier. In other words, among the foreground pixels, those not largely affecting the level of the image quality are dealt with not as the foreground but as the background. Furthermore, in accordance with the correction of the IC table, a foreground layer having N kinds of foreground identifiers is corrected to a foreground layer having M kinds of foreground identifiers.

When the number M of kinds of foreground identifiers is not more than the prescribed number P in the corrected IC table, the corrected foreground layer is separated into M binary images, and each binary image (or a binary image obtained by simply binarizing the corrected foreground layer when M=1) is subjected to the lossless compression. Also, the background layer is subjected to the lossy compression. As a result, information of a part of the foreground that largely affects the level of the image quality is subjected to the lossless compression and information of another part of the foreground that does not largely affect the level of the image quality and information of the background are together subjected to the lossy compression, and therefore, degradation of the image quality is suppressed and a resultant file size is reduced.

On the other hand, when the number M exceeds the prescribed number P in the corrected IC table, the lossless compression is not performed and the background layer is subjected to the lossy compression as described later. This is because when the foreground layer is separated into binary images in number larger than P for the compression, the resultant file size is excessively large. Furthermore, if the number of binary images is reduced by replacing a foreground identifier corresponding to pixels in number exceeding the prescribed number K with the background identifier, a pixel that largely affects the level of the image quality is dealt with not as the foreground but as the background to be lossy compressed, and hence, it is apprehended that the image quality may be largely degraded.

It is noted that the background layer is subjected to prescribed image processing for emphasizing an image included in the background layer before performing the lossy compression so as not to largely degrade the image quality through the lossy compression (namely, so as not to make illegible a text corresponding to the foreground).

Next, the quality priority compression mode will be described.

In the quality priority compression mode, after generating a foreground layer, when the number N of kinds of foreground identifiers is not more than the prescribed number P, the generated foreground layer is separated into N binary images without reducing the number N of kinds of the foreground identifiers to M, and each binary image (and a binary image obtained by simply binarizing the generated foreground layer when N=1) is subjected to the lossless compression. Also, a background layer is subjected to the lossy compression. This is because when the foreground layer is separated into binary images in number not more than P to be lossless compressed, a resultant file size is sufficiently small. Therefore, there is no need to reduce the number of kinds of foreground identifiers.

On the other hand, after generating a foreground layer, when the number N of kinds of foreground identifiers exceeds the prescribed number P and is not more than a prescribed number Q (wherein Q is a natural number larger than P), an IC table is corrected so that the number N of kinds of foreground identifiers can be reduced to M. For this purpose, processing for replacing a foreground identifier corresponding to pixels, which are smaller in number than the prescribed number K and are the smallest in number, with the background identifier is repeatedly executed under a condition of M≧P. In other words, among the foreground pixels, pixels not largely affecting the level of the image quality are dealt with not as the foreground but as the background. Furthermore, a problem that the image quality is largely degraded because of excessive reduction of foreground identifiers and excessive increase of information of the foreground to be lossless compressed is thus suppressed. Furthermore, in accordance with the correction of the IC table, the foreground layer including N kinds of foreground identifiers is corrected to a foreground layer including M kinds of foreground identifiers.

In the corrected IC table, when the number M of kinds of foreground identifiers is not more than the prescribed number P, the corrected foreground layer is separated into M binary images and each binary image is subjected to the lossless compression in the same manner as in the size priority compression mode. Also, the background layer is subjected to the lossy compression. On the other hand, in the corrected IC table, when M exceeds the prescribed number P, the lossless compression is not executed and the background layer is subjected to the lossy compression in the same manner as in the size priority compression mode.

After generating a foreground layer, when the number N of kinds of foreground identifiers exceeds the prescribed number Q, the number N of kinds of foreground identifiers is not reduced to M and the lossless compression is not executed, and the background layer is subjected to the lossy compression. This is because if the foreground layer is separated into binary images in number larger than Q to be compressed, a resultant file size is excessively large, and it is apprehended that the image quality may be largely degraded by reducing the kinds of identifiers in number larger than Q to P. However, the background layer is subjected to prescribed image processing for emphasizing an image included in the background layer before performing the lossy compression so as not to largely degrade the image quality through the lossy compression.

In the following description, an IC table and a foreground layer generated on the basis of a color image and a foreground mask are designated as a generated IC table and a generated foreground layer, and a generated IC table and a generated foreground layer corrected as described below are designated as a corrected IC table and a corrected foreground layer. A generated IC table stores {N+1} kinds of identifiers (namely, N kinds of foreground identifiers and one kind of background identifier), and a corrected IC table stores {M+1} kinds of identifiers (namely, M kinds of foreground identifiers and one kind of background identifier). Also, when there is no need to distinguish a generated IC table and a generated foreground layer from a corrected IC table and a corrected foreground layer, they are simply designated as an IC table and a foreground layer.

A background layer will now be described. FIG. 4B exemplarily illustrates one background layer generated on the basis of the color image illustrated in FIG. 2 and the foreground mask illustrated in FIG. 4A. In a background layer, the background is expressed with colors of the background of the color image, and the foreground is expressed with colors of the background. More specifically, in a background layer, a color of the foreground of the color image is replaced with (i.e., covered by as it is called) a color of a portion of the background disposed in the vicinity of the foreground. In the background layer of FIG. 4B, the word "TEST" expressed with light blue, red, violet and blue in the color image is expressed with green, which is the same color as the area filled in with green, and cannot be distinguished from the area filled in with green. Also, a portion where the sentence "This is a test image." is expressed with black in the color image is a white ground in the background layer.

A user of the image compressing apparatus 1 provides a color image to the image compressing apparatus 1, so as to store a compression file obtained by compressing the provided color image in, for example, a large capacity storage not shown but included in the image compressing apparatus 1. It is noted that the compression file may be externally transmitted. For this purpose, the user sets a document in the image compressing apparatus 1, pushes the size priority button 171 or the quality priority button 172 of the operation panel 17 and pushes the start button 170. When the user desires to compress the color image in the size priority compression mode, the size priority button 171 is pushed, and when the user desires to compress the color image in the quality priority compression mode, the quality priority button 172 is pushed. Furthermore, in the image compressing apparatus 1, for example, the size priority compression mode is set as the default compression mode.

Figure 6:
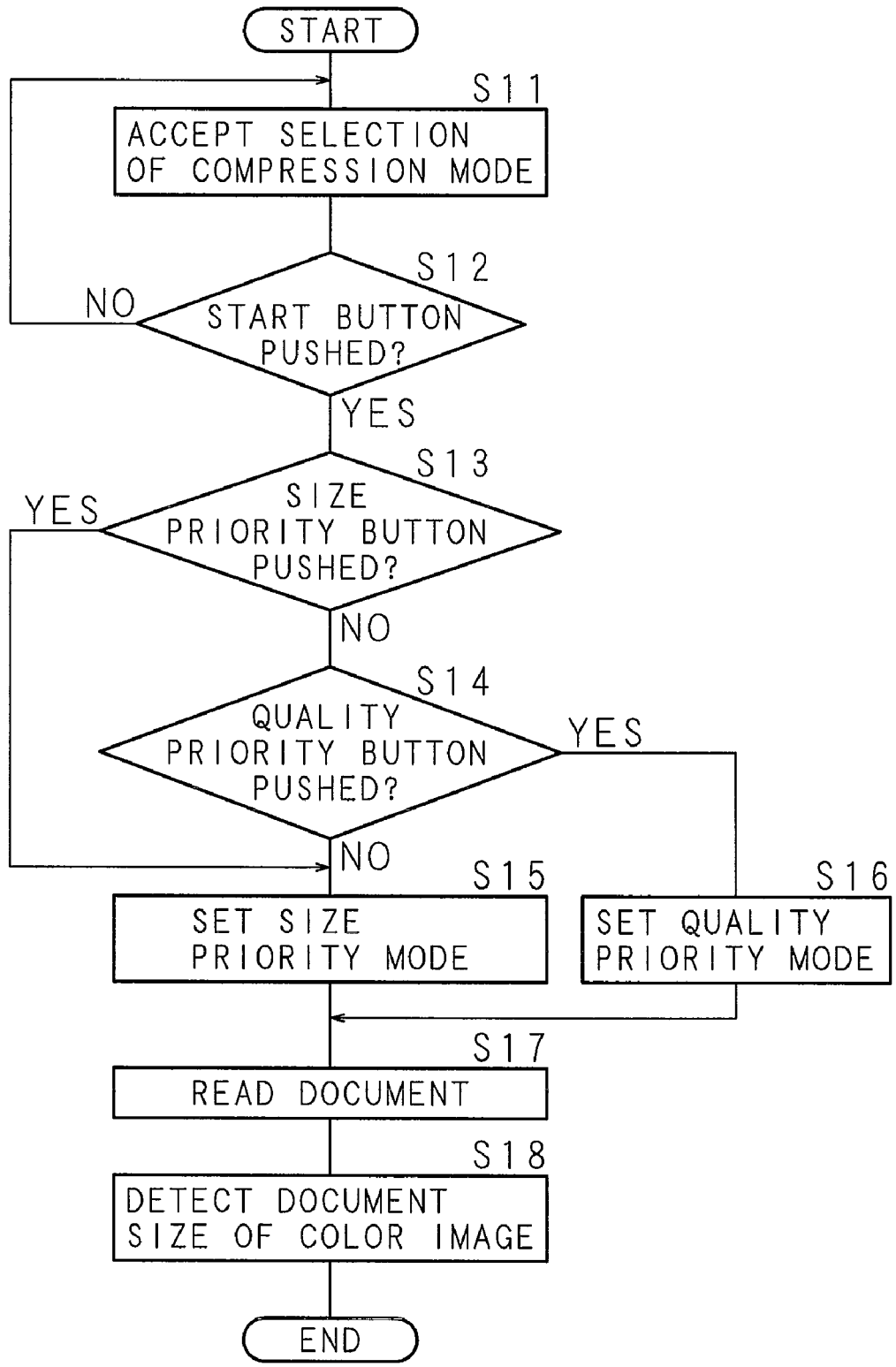
FIG. 6 is a flowchart illustrating procedures in an image reading processing executed in the image compressing apparatus of Embodiment 1.

FIG. 6 is a flowchart illustrating procedures in image reading processing executed in the image compressing apparatus 1. The image reading processing is executed by the CPU 10 when, for example, a user operates the operation panel 17 for setting a scanner mode in the image compressing apparatus 1. For example, with the size priority button 171 and the quality priority button 172 provided as soft keys of a touch panel not shown of the operation panel 17, the CPU 10 accepts selection of a compression mode (S11) and determines whether or not the start button 170 has been pushed (S12). When the start button 170 has not been pushed (NO in S12), the CPU 10 returns the procedure to S11 for continuously accepting the selection of a compression mode.

When the start button 170 has been pushed (YES in S12), the CPU 10 determines whether or not the size priority button 171 has been pushed before the start button 170 being pushed (S13), and when it has not been pushed (NO in S13), the CPU 10 determines whether or not the quality priority button 172 has been pushed before the start button 170 being pushed (S14). When the size priority button 171 has been pushed (YES in S13), or when the quality priority button 172 has not been pushed (NO in S14), the CPU 10 sets the size priority compression mode in the image compressing unit 2 (S15). On the other hand, when the quality priority button 172 has been pushed (YES in S14), the CPU 10 sets the quality priority compression mode in the image compressing unit 2 (S16).

After setting the compression mode in S15 or S16, the CPU 10 controls the color scanner unit 130 to start reading a document (S17). A color image thus read is subjected to prescribed image processing such as A/D (analog/digital) conversion or shading compensation before being stored in the image memory 11.

After completing procedure of S17, the CPU 10 detects the document size of the color image having been read by the color scanner unit 130 and stored in the image memory 11 (S18), supplies the detected document size to the image compressing unit 2 and completes the image reading processing. At this point, the operation panel 17 functions as a selecting unit in the image reading processing. It is noted that, for example, the CPU 10 or the processor 220 of the foreground layer generating unit 22 may automatically select one of the compression modes in accordance with the contents of the color image.

The respective components of the image compressing unit 2 will now be described. In the foreground mask generating unit 21 of FIG. 1, one foreground mask as illustrated in FIG. 3 is generated on the basis of a color image as illustrated in FIG. 2. For this purpose, a color image transferred from the image memory 11 is inputted to the foreground mask generating unit 21 through the transfer control unit 12, a processor not shown included in the foreground mask generating unit 21 generates a foreground mask on the basis of the inputted color image, the generated foreground mask is outputted from the foreground mask generating unit 21 and transferred to the image memory 11 through the transfer control unit 12 to be written in the image memory 11.

In the foreground mask generating unit 21 to which the color image has been inputted, a foreground mask including foreground pixels and corresponding to a text and/or a line drawing included in the color image is generated on the basis of the inputted color image by a known method. For example, in the foreground mask generating unit 21, brightness values of respective pixels of a color image are differentiated so as to detect an edge portion where the brightness is increased to be bright and an edge portion where the brightness is decreased to be dark. Pixels determined to correspond to the foreground based on the detected edge portions are provided with a pixel value of "0", and pixels determined to correspond to the background are provided with a pixel value of "1".

In the foreground layer generating unit 22 illustrated in FIG. 1, a generated IC table and a generated foreground layer are generated on the basis of one color image as illustrated in FIG. 2 and one foreground mask as illustrated in FIG. 3. For this purpose, a color image and a foreground mask transferred through the transfer control unit 12 from the image memory 11 are inputted to the foreground layer generating unit 22. Also, in the foreground layer generating unit 22, the processor 220 of the foreground layer generating unit 22 generates a generated IC table and a generated foreground layer on the basis of the color image and the foreground mask inputted thereto. The generated IC table is stored in the table storage 221, and the generated foreground layer is outputted from the foreground layer generating unit 22 and transferred through the transfer control unit 12 to the image memory 11 to be written in the image memory 11.

An address of a memory area for storing a foreground layer in the image memory 11 (more precisely, a starting address of a position at which the foreground layer is to be started to be written) is precedently given to the foreground layer generating unit 22 by the CPU 10, and the foreground layer is started to be written in the image memory 11 with the starting address set as the position for starting writing of the foreground layer.

In the case where the foreground layer generating unit 22 includes a buffer memory with a sufficient memory capacity, the generated foreground layer may be temporarily stored in the buffer memory. In this case, when the generated foreground layer is not corrected, the generated foreground layer is read from the buffer memory to be transferred to the image memory 11, and when the generated foreground layer is corrected, the corrected foreground layer is transferred to the image memory 11 instead of the generated foreground layer.

The foreground layer generating unit 22 to which a color image and a foreground mask have been inputted generates a generated IC table as well as a generated foreground layer on the basis of the inputted color image and foreground mask by, for example, a method disclosed in Japanese Patent Application Laid-Open No. 2002-94805 or 2004-229261. In this method, if color information of one foreground pixel has not been stored in the IC table, a new foreground identifier is allocated to the color information, and the color information and the allocated foreground identifier are stored in the generated IC table, and the color information of this pixel is replaced with the foreground identifier stored in the generated IC table. On the other hand, if color information of one foreground pixel has already been stored in the generated IC table, the color information of this pixel is replaced with the foreground identifier stored in the generated IC table. Furthermore, the color information of respective background pixels is all replaced with a prescribed background identifier stored in the generated IC table.

In the IC table generated by the foreground layer generating unit 22, color information included in the foreground of the color image, a foreground identifier for identifying the color information and the number of pixels having the foreground identifier are correlated and stored with one another. In this embodiment, color information is indicated with an R value, a G value and B value each of an integer of "0" through "256", and an identifier is indicated by an integer of "0" through "7".

Furthermore, the generated IC table stores maximum and minimum coordinate values of pixels having each color information in a coordinate along one direction and another crossing direction. These coordinate values are used, for example, when the prescribed number K of pixels is determined on the basis of the rectangle size of a foreground, and as these coordinate values, the maximum X coordinate value XL and the minimum X coordinate value XS along the X axis direction and the maximum Y coordinate value YL and the minimum Y coordinate value YS along the Y axis direction are stored. At this point, the main scanning direction for a color image, a foreground layer and the like corresponds to the forward direction along the X axis, and the sub scanning direction corresponds to the forward direction along the Y axis.

Figure 7:
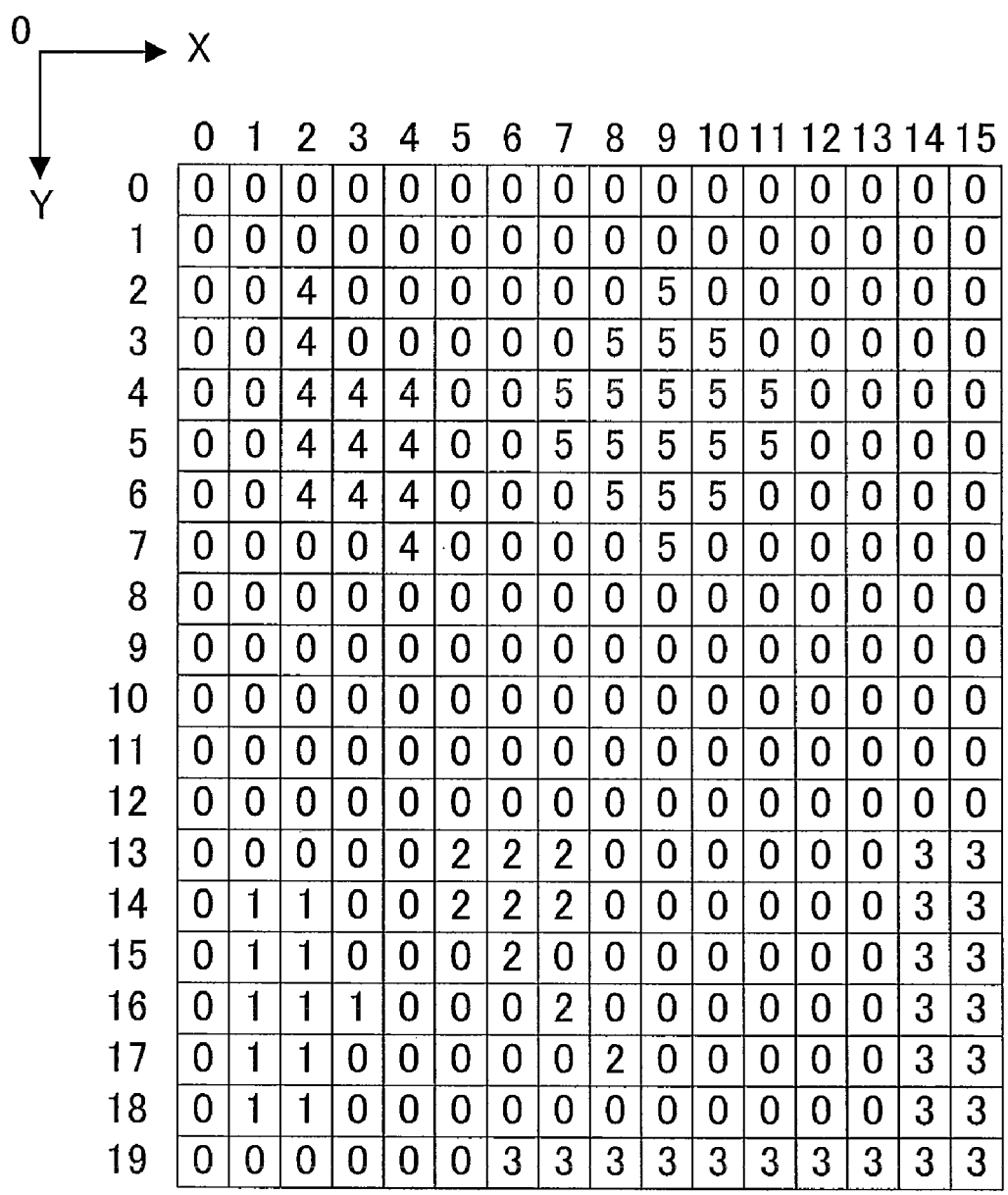
FIG. 7 is a schematic diagram of exemplary pixel values of a generated foreground layer generated in the image compressing apparatus of Embodiment 1.

The IC table will now be described by using a specific example. FIG. 7 is a schematic diagram of exemplary pixel values of a generated foreground layer generated in the image compressing apparatus 1, in which one generated foreground layer is illustrated. Also, FIG. 8 is a schematic diagram of an exemplary generated IC table generated in the image compressing apparatus 1, in which a generated IC table corresponding to the generated foreground layer illustrated in FIG. 7 is illustrated. The generated IC table stores an address, an identifier, a minimum X coordinate value XS, a maximum X coordinate value XL, a minimum Y coordinate value YS, a maximum Y coordinate value YL, an R value, a G value and a B value of color information and the number of pixels correlatively to one another. At this point, the address is an address in the table storage 221 where the identifier is stored.

In the foreground layer generating unit 22, a generated IC table as illustrated in FIG. 8 is generated. In this generated IC table, identifiers are listed in the ascending order. Also, in the case where the identifier accords with the address, there is no need to store the address in the generated IC table and the address may be omitted. In the generated foreground layer illustrated in FIG. 7, X coordinate values of respective pixels have integer values of "0" through "15", Y coordinate values have integer values of "0" through "19", and the number of pixels is "320" (=16×20).

As illustrated in FIGS. 7 and 8, the generated foreground layer includes, as foreground pixels, 11 pixels having a foreground identifier "1" corresponding to green (R, G, B=0, 255, 0), 9 pixels having a foreground identifier "2" corresponding to light blue (R, G, B=0, 255, 255), 22 pixels having a foreground identifier "3" corresponding to red (R, G, B=255, 0, 0), 12 pixels having a foreground identifier "4" corresponding to violet (R, G, B=128, 0, 128), and 18 pixels having a foreground identifier "5" corresponding to blue (R, G, B=0, 0, 255). Also, it includes, as background pixels, 248 pixels having a background identifier "0" corresponding to white (R, G, B=255, 255, 255).

The pixel group having the foreground identifier "1" has a minimum X coordinate value XS of "1", a maximum X coordinate value XL of "3", a minimum Y coordinate value YS of "14" and a maximum Y coordinate value YL of "18". Similarly, the pixel group having the foreground identifier "2" has a minimum X coordinate value XS of "5", a maximum X coordinate value XL of "8", a minimum Y coordinate value YS of "13" and a maximum Y coordinate value YL of "17". If every foreground identifier in the pixel group having the foreground identifier "2" illustrated in FIG. 7 is the foreground identifier "1" instead, a minimum X coordinate value of "1", a minimum Y coordinate value of "13", a maximum X coordinate value of "8", a maximum Y coordinate value of "18" and the number of pixels of "20" are listed in the row of the foreground identifier "1" of the IC table illustrated in FIG. 8.

Figure 9:
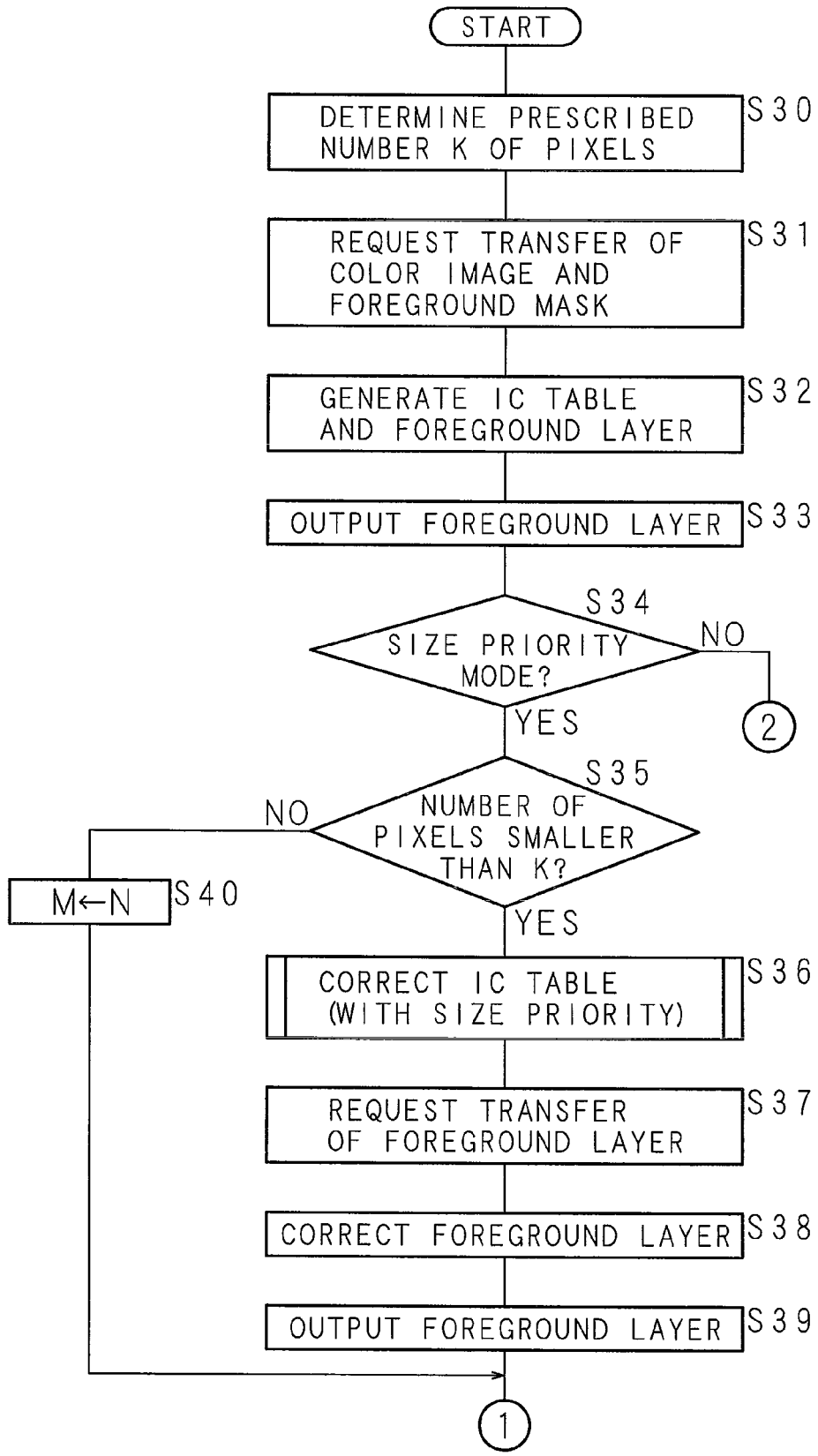
FIG. 9 is a flowchart illustrating procedures in a foreground image processing executed in the image compressing apparatus of Embodiment 1.
Figure 10:
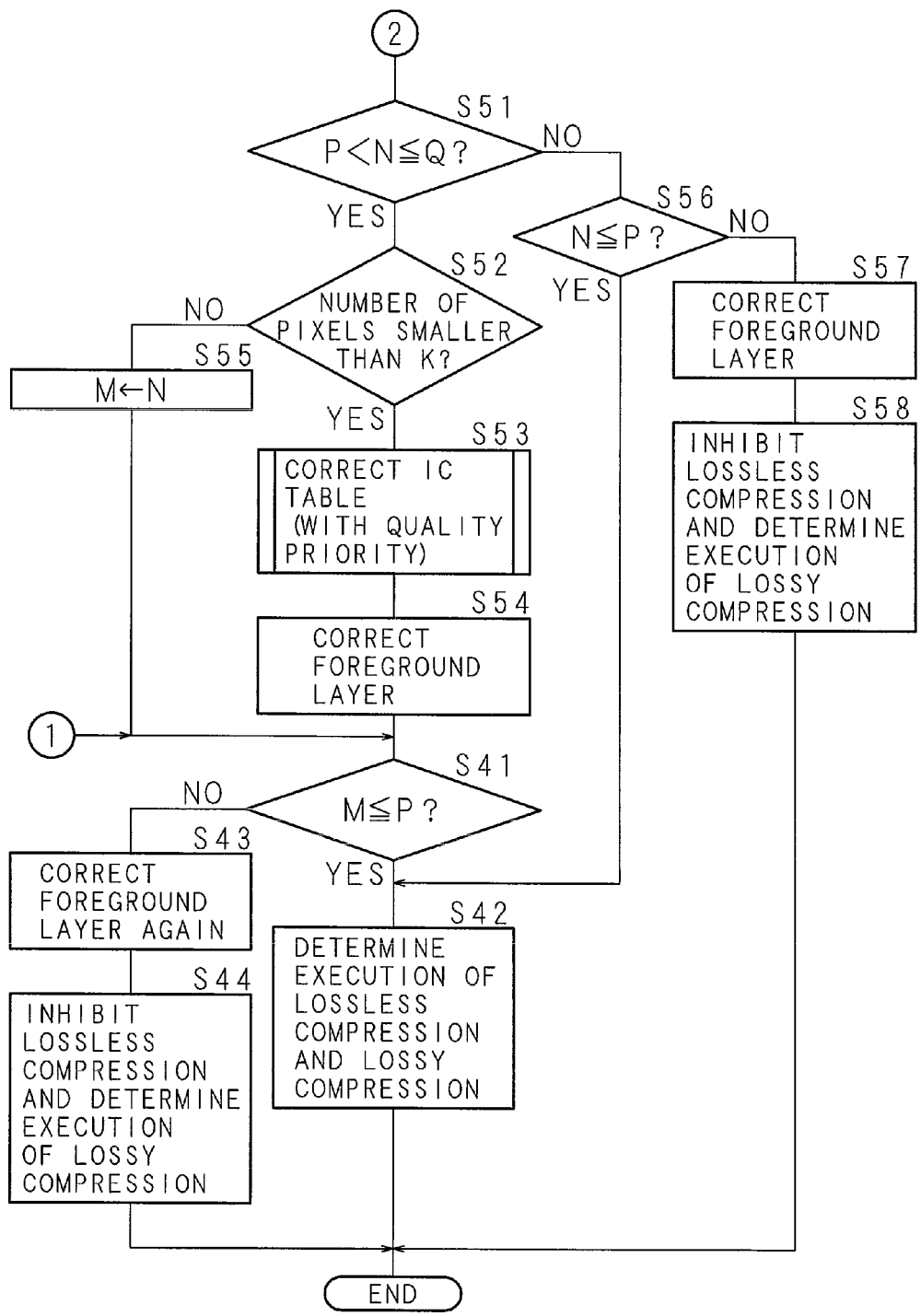
FIG. 10 is a flowchart illustrating procedures in the foreground image processing executed in the image compressing apparatus of Embodiment 1.

FIGS. 9 and 10 are flowcharts illustrating procedures in foreground image processing executed in the image compressing apparatus 1. The foreground image processing is executed by the processor 220 of the foreground layer generating unit 22 when a control signal corresponding to timing for generating a generated foreground layer is supplied to the foreground layer generating unit 22.

First, the processor 220 determines the prescribed number K of pixels on the basis of the document size of a color image supplied from the CPU 10 (S30). The foreground layer generating unit 22 functions as a pixel number determining unit in S30. The prescribed number K of pixels is determined with respect to each color image so that similar foreground colors (colors of texts in particular) can be reproduced through compression of a plurality of color images having the same color arrangement but different document sizes.

It is noted that the prescribed number K of pixels is not limited to be determined by the foreground layer generating unit 22 but may be determined by, for example, the CPU 10. Also, the prescribed number K of pixels is not limited to be determined on the basis of the document size of a color image. For example, it may be determined on the basis of a color image stored in the image memory 11 depending upon the number of foreground pixels or the rectangle size of a foreground included in a foreground layer generated by the foreground layer generating unit 22 as described below. In this case, the prescribed number K of pixels is determined with respect to each color image so as to reproduce similar foreground colors (colors of texts in particular) through the compression of a plurality of color images different from one another in the number of foreground pixels or in the rectangle size.

After determining the prescribed number K of pixels in S30, the processor 220 requests transfer of the color image and the foreground mask (S31), generates a generated IC table as well as a generated foreground layer on the basis of the color image and the foreground mask inputted to the foreground layer generating unit 22 (S32), and outputs the generated foreground layer thus generated to the transfer control unit 12 (S33). The generated IC table generated in S32 is stored in the table storage 221, and the generated foreground layer outputted in S33 is stored in the image memory 11.

More specifically, each of the color image and the foreground mask is inputted to the foreground layer generating unit 22 with one line or one block thereof inputted at one time. The processor 220 modifies, on the basis of one line or one block of the color image or the foreground mask thus inputted, various data of the generated IC table stored in the table storage 221, replaces a pixel value of each pixel included in one line or one block of the color image with an identifier, and outputs the resultant one line or one block of the color image in which a pixel value has been replaced with an identifier, namely, one line or one block of a generated foreground layer, to the transfer control unit 12. The foreground layer generating unit 22 functions as a foreground layer generating unit and a table generating unit in S32.

After outputting the generated foreground layer, the processor 220 determines whether or not the size priority compression mode has been set in the image compressing unit 2 (S34). In the image compressing apparatus 1 of this embodiment, depending upon whether the size priority compression mode or the quality priority compression mode is set, processing for reducing the number of kinds of foreground identifiers to be smaller than N (or allowing it to remain as N) is executed through different procedures. The foreground layer generating unit 22 functions as a reduction determining unit in S34.

When the size priority compression mode is set in the image compressing unit 2 (YES in S34), the processor 220 executes various processing for reducing the number of kinds of foreground identifiers to be smaller than N. For this purpose, the processor 220 refers to the generated IC table stored in the table storage 221 so as to determine whether or not a foreground identifier corresponding to pixels in number smaller than the prescribed number K is stored (S35).

When the generated IC table stores a foreground identifier corresponding to pixels in number smaller than the prescribed number K (YES in S35), the processor 220 corrects the generated IC table to a corrected IC table by replacing the foreground identifier corresponding to pixels in number smaller than the prescribed number K with the background identifier (S36). At this point, the data of the generated IC table stored in the table storage 221 is modified, and hence, the generated IC table is corrected to a corrected IC table.

Figure 11:
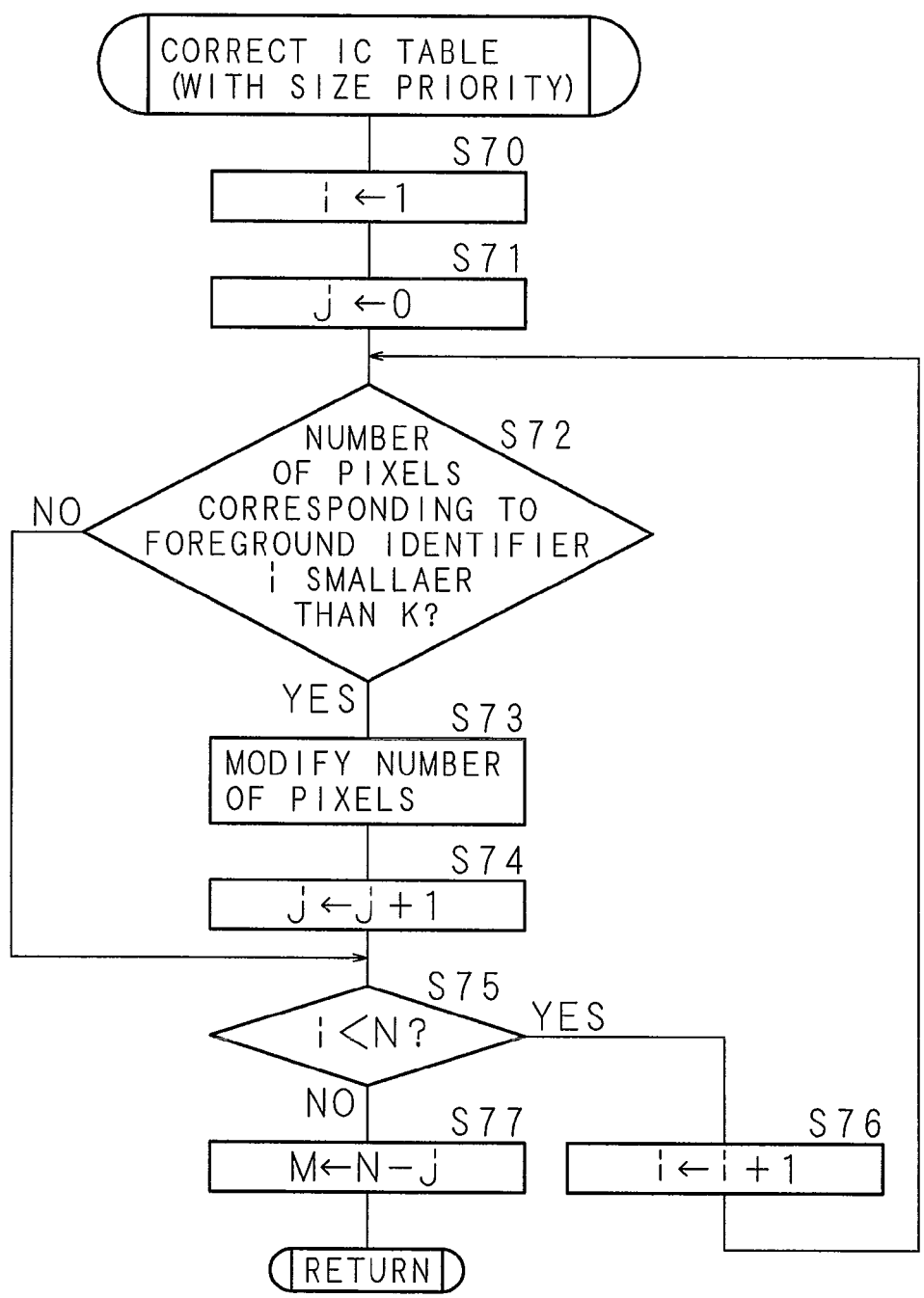
FIG. 11 is a flowchart illustrating a subroutine of a size priority IC table processing procedure executed in the image compressing apparatus of Embodiment 1.

At this point, details of the procedure performed in S36 will be exemplarily described. FIG. 11 is a flowchart illustrating a subroutine of a size priority IC table processing procedure executed in the image compressing apparatus 1.

First, the processor 220 substitutes "1" for a parameter i (S70) and substitutes "0" for a parameter j (S71). Next, the processor 220 refers to the generated IC table so as to determine whether or not the number of pixels corresponding to the foreground identifier "i" is smaller than the prescribed number K (S72). When the number of pixels corresponding to the foreground identifier "i" is smaller than the prescribed number K (YES in S72), the processor 220 modifies the number of pixels corresponding to the foreground identifier "i" to "0" (S73). At this point, the foreground identifier with the number of pixels of "0" corresponds to a foreground identifier to be replaced with the background identifier.

Subsequently, the processor 220 increments the parameter j (S74). At this point, the parameter j corresponds to the number of kinds of foreground identifiers having been replaced with the background identifier. After completing the procedure of S74 or when the number of pixels corresponding to the identifier "i" is not less than the prescribed number K (NO in S72), the processor 220 determines whether or not the parameter i is smaller than N (S75). When i<N (YES in S75), the processor 220 increments the parameter i (S76) and returns the procedure to S72. When i≧N (NO in S75), the processor 220 substitutes M for a difference obtained by subtracting j from N (S77), and returns the procedure to the original routine.

After correcting the generated IC table to the corrected IC table in S36, the processor 220 requests transfer of the generated foreground layer (S37), corrects the generated foreground layer to a corrected foreground layer by replacing, with respect to pixels included in the inputted generated foreground layer, the foreground identifier having been replaced with the background identifier in the corrected IC table with the background identifier (S38), and outputs the corrected foreground layer thus corrected to the transfer control unit 12 (S39). In the image memory 11, the generated foreground layer is overwritten by the corrected foreground layer outputted in S39. At this point, the foreground layer generating unit 22 functions as a table replacing unit and a foreground layer correcting unit in S36 and S38.

Figure 12:
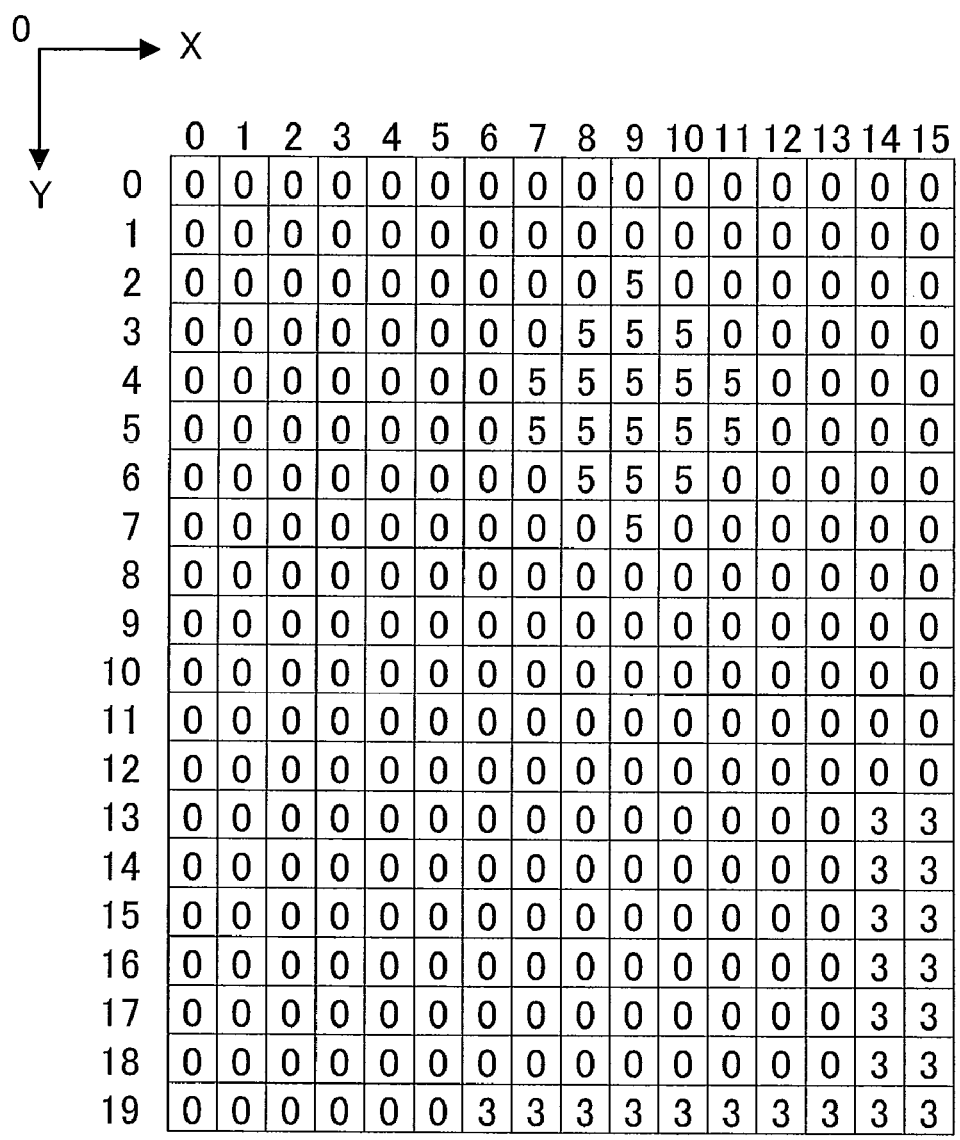
FIG. 12 is a schematic diagram of exemplary pixel values of a corrected foreground layer (with size priority) corrected in the image compressing apparatus of Embodiment 1.

FIG. 12 is a schematic diagram of exemplary pixel values of a corrected foreground layer corrected in the image compressing apparatus 1, in which one corrected foreground layer is illustrated. Also, FIG. 13 is a schematic diagram illustrating an exemplary corrected IC table corrected in the image compressing apparatus 1, in which a corrected IC table corresponding to the corrected foreground layer illustrated in FIG. 12 is illustrated.

When the prescribed number K of pixels is "16" and the prescribed number P is "4", the numbers of pixels corresponding to foreground identifiers "1", "2" and "4" are "11", "9" and "12", respectively, all of which are smaller than the prescribed number K, in the generated IC table illustrated in FIG. 8. Therefore, the foreground identifiers "1", "2" and "4" are replaced with the background identifier "0". Thus, the number N (=5) of kinds of foreground identifiers is reduced to M (=2) smaller than the prescribed number P.

Figure 13:
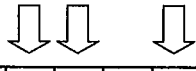
FIG. 13 is a schematic diagram of an exemplary corrected index color table (with size priority) corrected in the image compressing apparatus of Embodiment 1.

In this manner, the generated IC table illustrated in FIG. 8 is corrected to the corrected IC table illustrated in FIG. 13. As a result, the generated foreground layer illustrated in FIG. 7 is corrected to the corrected foreground layer illustrated in FIG. 12. Specifically, the generated foreground layer including the foreground identifiers "1" through "5" and the background identifier "0" is corrected to the corrected foreground layer including the foreground identifiers "3" and "5" and the background identifier "0".

In the case where a generated IC table stored in the table storage 221 stores merely a foreground identifier corresponding to pixels in number exceeding the prescribed number K (NO in S35), the number of kinds of identifiers cannot be reduced to be smaller than N. However, when the processor 220 substitutes N for M (S40), a generated IC table and a generated foreground layer can be dealt with similarly to a corrected IC table and a corrected foreground layer. In the following description, a generated IC table and a generated foreground layer, which have not been substantially corrected because it is determined NO in S35, are also dealt with as a corrected IC table and a corrected foreground layer.

After completing the procedure of S39 or S40, the processor 220 determines whether or not the number M of kinds of foreground identifiers is not more than the prescribed number P (S41), and when M≦P (YES in S41), it determines to execute both the lossless compression and the lossy compression (S42), and the foreground image processing is completed. In S42, an execution decision signal corresponding to decision of the execution of both the lossless compression and the lossy compression is outputted from the processor 220 to the background layer generating unit 25.

On the other hand, when M>P (NO in S41), the processor 220 requests transfer of the corrected foreground layer through the same procedure as in S37, corrects again the corrected foreground layer by replacing all the foreground identifiers with the background identifier with respect to the pixels included in the inputted corrected foreground layer (S43), and outputs the corrected foreground layer thus corrected again (hereinafter referred to as the all-replaced foreground layer) to the transfer control unit 12 through the same procedure as in S39. In the image memory 11, the corrected foreground layer is overwritten by the all-replaced foreground layer outputted at this point. Furthermore, the processor 220 inhibits execution of the lossless compression and determines the execution of the lossy compression (S44), and the foreground image processing is completed. In S44, an inhibition decision signal corresponding to inhibition of the execution of the lossless compression and decision of the execution of the lossy compression is outputted from the processor 220 to the background layer generating unit 25.

In the case where the quality priority compression mode is set in the image compressing unit 2 (NO in S34), the processor 220 determines whether or not the number N of kinds of foreground identifiers exceeds the prescribed number P and is not more than the prescribed number Q (S51). When P<N≦Q (YES in S51), the processor 220 executes various processing for reducing the number of kinds of foreground identifiers to be smaller than N. For this purpose, the processor 220 refers to the generated IC table stored in the table storage 221 so as to determine whether or not a foreground identifier corresponding to pixels in number smaller than the prescribed number K is stored (S52).

When a foreground identifier corresponding to pixels in number smaller than the prescribed number K is stored in the generated IC table (YES in S52), the processor 220 corrects the generated IC table to a corrected IC table by replacing foreground identifiers with the background identifier successively in the ascending order of the number of pixels from a foreground identifier corresponding to pixels, which are smaller in number than the prescribed number K and are the smallest in number, under a condition that the number M of kinds of foreground identifiers is not less than the prescribed number P (S53). At this point, the data of the generated IC table stored in the table storage 221 is modified, and thus, the generated IC table is corrected to a corrected IC table.

At this point, details of the procedure performed in S53 will be exemplarily described.

Figure 14:
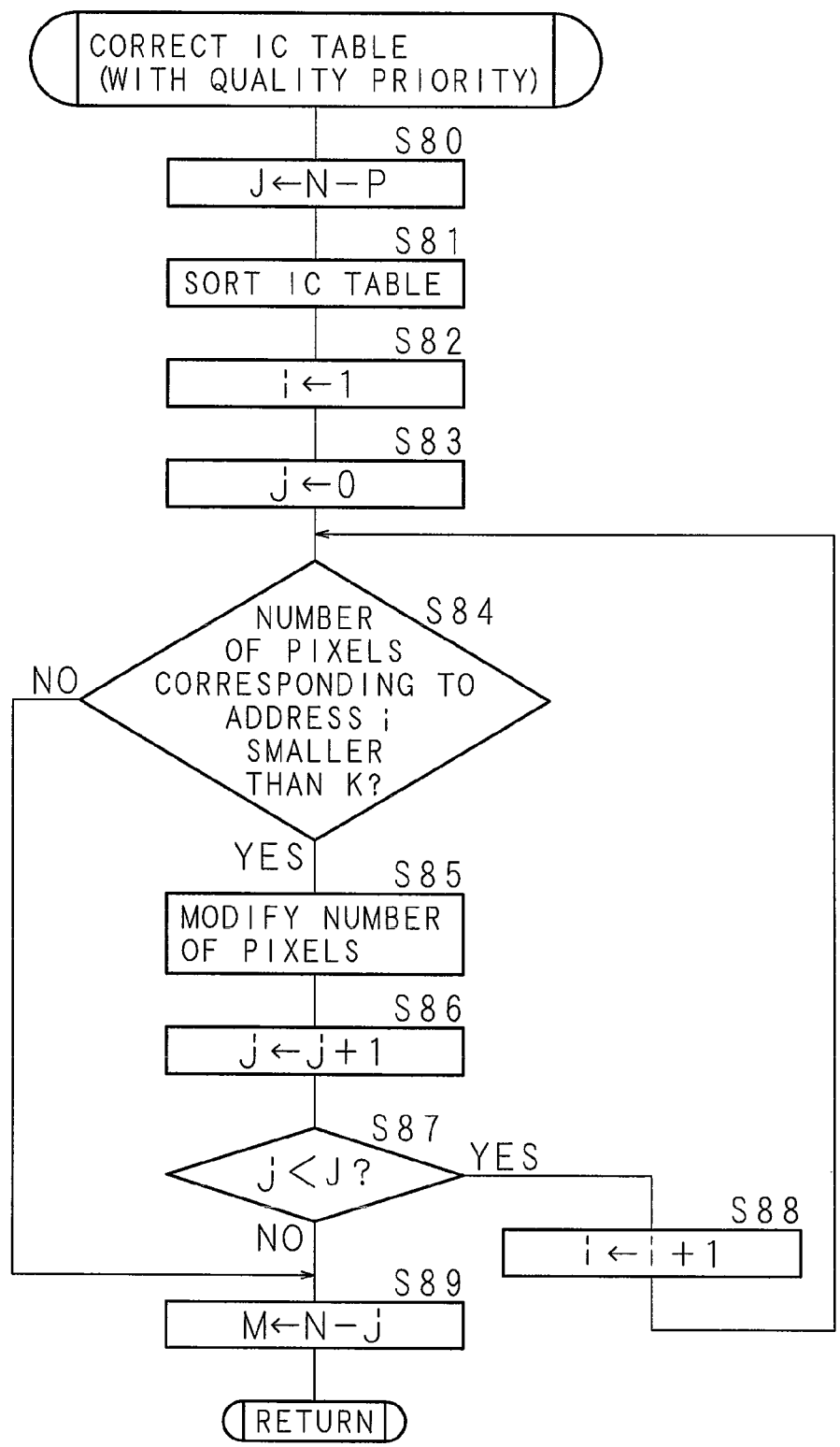
FIG. 14 is a flowchart illustrating a subroutine of a quality priority IC table processing procedure executed in the image compressing apparatus of Embodiment 1.

FIG. 14 is a flowchart illustrating a subroutine of quality priority IC table processing procedure executed in the image compressing apparatus 1.

First, the processor 220 substitutes a constant J for a difference obtained by subtracting the prescribed number P from N (S80). At this point, the constant J corresponds to the maximum number of kinds of foreground identifiers to be replaced with the background identifier. Next, the processor 220 sorts the foreground identifiers listed in the generated IC table in the ascending order of the number of pixels (S81), substitutes "1" for a parameter i (S82) and substitutes "0" for a parameter j (S83). The processor 220 refers to the generated IC table so as to determine whether or not the number of pixels stored correlatively to an address "i" is smaller than the prescribed number K (S84).

When the number of pixels stored correlatively to the address "i" is smaller than the prescribed number K (YES in S84), the processor 220 modifies the number of pixels corresponding to a foreground identifier "i" to "0" (S85). At this point, a foreground identifier with the number of pixels of "0" corresponds to a foreground identifier to be replaced with the background identifier. Next, the processor 220 increments the parameter j (S86). At this point, the parameter j corresponds to the number of kinds of foreground identifiers having been replaced with the background identifier.

After completing the procedure of S85, the processor 220 determines whether or not the parameter j is smaller than the constant J (S87). When j<J (YES in S87), the processor 220 increments the parameter i (S88), and returns the procedure to S84. When j≧J (NO in S87) or when the number of pixels stored correlatively to the address "i" is not less than the prescribed number K (NO in S84), the processor substitutes M for a difference obtained by subtracting the parameter j from N (S89), and returns the procedure to the original routine. It is noted that the foreground layer generating unit 22 may include N buffer memories at most for holding N foreground identifiers corresponding to pixels in smaller numbers in the ascending order of the number of pixels so as to select foreground identifiers to be replaced with the background identifier.

After correcting the generated IC table to the corrected IC table in S53, the processor 220 requests transfer of the generated foreground layer in the same procedure as in S36, corrects the generated foreground layer to a corrected foreground layer by replacing, with respect to pixels included in the inputted generated foreground layer, the foreground identifier having been replaced with the background identifier in the corrected IC table with the background identifier (S54), and outputs the corrected foreground layer to the transfer control unit 12 in the same procedure as in S39. In the image memory 11, the generated foreground layer is overwritten by the corrected foreground layer outputted at this point. The foreground layer generating unit 22 functions as a table replacing unit and a foreground layer correcting unit in S53 and S54.

Figure 15:
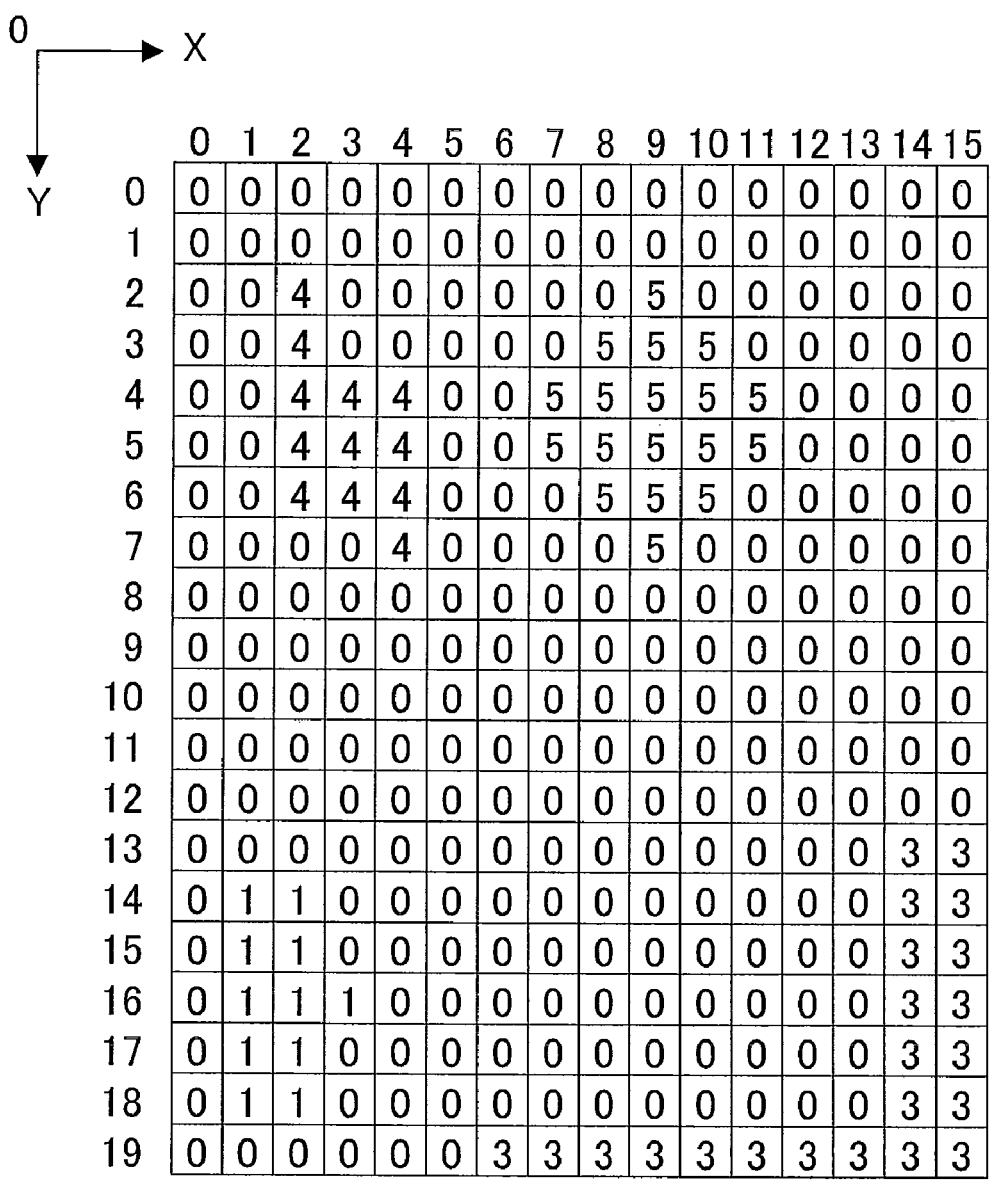
FIG. 15 is a schematic diagram of exemplary pixel values of a corrected foreground layer (with quality priority) corrected in the image compressing apparatus of Embodiment 1.
Figure 16:
FIG. 16 is a schematic diagram of an exemplary corrected index color table (with quality priority) corrected in the image compressing apparatus of Embodiment 1.

FIG. 15 is a schematic diagram of exemplary pixel values of a corrected foreground layer corrected in the image compressing apparatus 1, in which one corrected foreground layer is illustrated. FIG. 16 is a schematic diagram of an exemplary corrected IC table corrected in the image compressing apparatus 1, in which a corrected IC table corresponding to the corrected foreground layer of FIG. 15 is illustrated.

When the prescribed number K of pixels is "16" and the prescribed number P is "4", the foreground identifier "2" corresponding to pixels, which are in number not more than "16" and the smallest in number, is replaced with the background identifier "0" in the generated IC table illustrated in FIG. 8. At this point, the number N (=5) of kinds of foreground identifiers is reduced to M (=4) equal to the prescribed number P. Accordingly, the foreground identifiers "1" and "4" corresponding to pixels, which are smaller in number than the prescribed number K, are never replaced with the background identifier "0".

In this manner, the generated IC table illustrated in FIG. 8 is corrected to the corrected IC table illustrated in FIG. 16. As a result, the generated foreground layer illustrated in FIG. 7 is corrected to the corrected foreground layer illustrated in FIG. 15. In other words, the generated foreground layer including the foreground identifiers "1" through "5" and the background identifier "0" is corrected to the corrected foreground layer including the foreground identifiers "1" and "3" through "5" and the background identifier "0".

In the case where the generated IC table stored in the table storage 221 merely stores a foreground identifier corresponding to pixels in number not less than the prescribed number K (NO in S52), the number of kinds of identifiers cannot be reduced to be smaller than N. However, when the processor 220 substitutes N for M (S55), the generated IC table and the generated foreground layer can be dealt with similarly to a corrected IC table and a corrected foreground layer. In the following description, a generated IC table and a generated foreground layer, which have not been substantially corrected because it is determined NO in S52, are also dealt with as a corrected IC table and a corrected foreground layer. After completing the procedure of S54 or S55, the processor 220 returns the procedure to S41.

When the condition of P<N≦Q is not met (NO in S51), the processor 220 determines whether or not the number N of kinds of foreground identifiers is not more than the prescribed number P (S56), and when N≦P (YES in S56), the procedure is proceeded to S42, so as to determine to execute both the lossless compression and the lossy compression, and the foreground image processing is completed. On the other hand, when N>Q (NO in S56), the processor 220 requests transfer of the generated foreground layer in the same manner as in S37, corrects the generated foreground layer by replacing all the foreground identifiers with the background identifier with respect to pixels included in the inputted generated foreground layer (S57), and outputs the generated foreground layer thus corrected (namely, the all-substituted foreground layer) to the transfer control unit 12 in the same manner as in S39. In the image memory 11, the generated foreground layer is overwritten by the all-substituted foreground layer outputted at this point. Also, the processor 220 inhibits execution of the lossless compression and determines execution of the lossy compression (S58), and the foreground image processing is completed. In S58, an inhibition decision signal is outputted from the processor 220 to the CPU 10.

In the case where the execution of the lossless compression is determined in S42 of the aforementioned foreground image processing, the foreground layer is compressed by employing the lossless compression technique. Also, the IC table is stored in the compression file together with a lossless compressed image. At this point, the IC table may be also lossless compressed. However, in order to improve the compression ratio of the foreground layer, one foreground layer is further separated before the compression. In the case where the number of kinds of foreground identifiers is N, one foreground layer is separated into N kinds of binary images respectively corresponding to the N kinds of foreground identifiers, and the respective binary images are compressed by employing the lossless compression technique. Similarly, in the case where the number of kinds of foreground identifiers is M, one foreground layer is separated into M kinds of binary images respectively corresponding to the M kinds of foreground identifiers, and the respective binary images are compressed by employing the lossless compression technique.

It is noted that the CPU 10 may function as a reduction determining unit by referring to the corrected IC table stored in the table storage 221.

Figure 17:
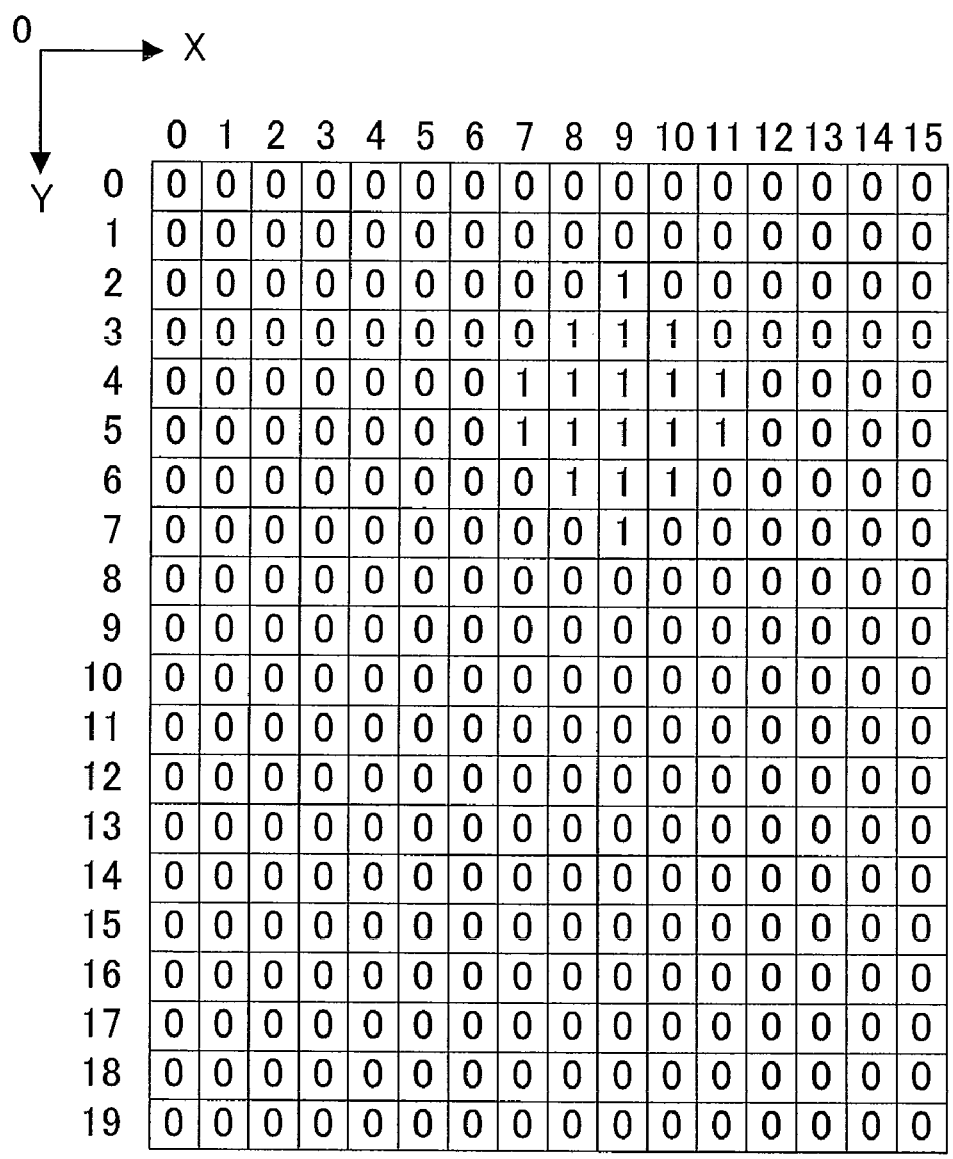
FIG. 17 is a schematic diagram of exemplary pixel values of a binary image corresponding to a foreground identifier "3" generated in the image compressing apparatus of Embodiment 1.

Since the procedure for the lossless compression is the same even if the number of binary images is different, the foreground layer illustrated in FIG. 12 will be exemplarily described in the following. In this foreground layer, the number of kinds of foreground identifiers is M (=2), and the foreground identifiers "3" and "5" and the background identifier "0" are included. FIGS. 17 and 18 are schematic diagrams of exemplary pixel values of binary images respectively corresponding to the foreground identifiers "3" and "5" generated in the image compressing apparatus 1, in each of which one binary image is illustrated. Such binary images are respectively lossless compressed, so as to generate a lossless compressed image.

In the binary image generating unit 23 illustrated in FIG. 1, M binary images as illustrated in FIGS. 17 and 18 are generated on the basis of one foreground layer as illustrated in FIG. 12. For this purpose, a foreground layer transferred from the image memory 11 is inputted through the transfer control unit 12 to the binary image generating unit 23, and a processor not shown of the binary image generating unit 23 generates M binary images on the basis of the inputted foreground layer, and the generated binary images are outputted from the binary image generating unit 23 and transferred through the transfer control unit 12 to the image memory 11 to be written in the image memory 11.

A binary image is easily obtained by replacing one foreground identifier included in a foreground layer with "1" and the other foreground identifiers with "0". Specifically, a foreground layer is inputted to the binary image generating unit 23 with, for example, one line thereof inputted at one time, and one line of the foreground layer thus inputted is temporarily stored in a buffer memory. A binary image of M lines is generated by reading the stored foreground layer by M times for replacing foreground identifiers, and the generated binary image is outputted to the transfer control unit 12.

In the binary image compressing unit 24 illustrated in FIG. 1, the lossless compression of one binary image as illustrated in FIG. 17 or 18 is repeatedly performed by M times. For this purpose, a binary image transferred from the image memory 11 is inputted through the transfer control unit 12 to the binary image compressing unit 24, and a processor not shown of the binary image compressing unit 24 generates, on the basis of the inputted binary image, one lossless compressed image by a known method, and the generated lossless compressed image is outputted from the binary image compressing unit 24 and transferred through the transfer control unit 12 to the image memory 11 to be written in the image memory 11.

In the case where the execution of the lossless compression is inhibited in S44 or S58 of the foreground image processing of FIG. 10, the foreground layer is not separated and is not compressed. Also, the foreground layer and the IC table are discarded and not included in the compression file.

The background layer generating unit 25 illustrated in FIG. 1 functions as a background generating unit. The background layer generating unit 25 generates a background layer as illustrated in FIG. 4B on the basis of one color image as illustrated in FIG. 2 and one foreground layer as illustrated in FIG. 4A. For this purpose, a color image and a foreground layer transferred from the image memory 11 are inputted through the transfer control unit 12 to the background layer generating unit 25. However, the foreground layer inputted at this point is a corrected foreground layer if the procedure of S38, S40, S54 or S55 has been executed, an all-substituted foreground layer if the procedure of S43 or S57 has been executed, and a generated foreground layer if it has been determined YES in S56.

Figure 19:
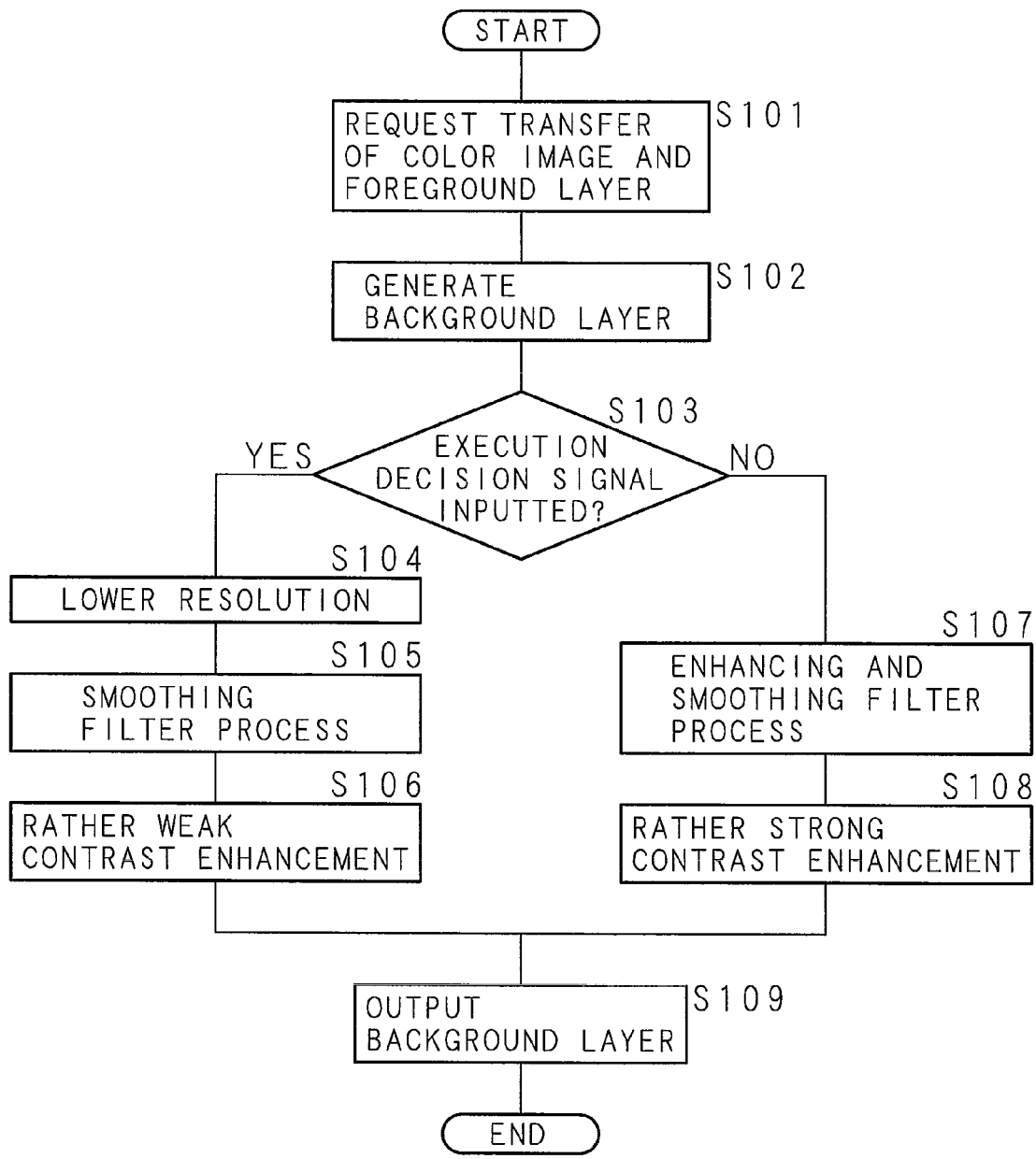
FIG. 19 is a flowchart illustrating procedures in a background image processing executed in the image compressing apparatus of Embodiment 1.

FIG. 19 is a flowchart illustrating procedures in background image processing executed in the image compressing apparatus 1. The background image processing is executed by the processor 250 of the background layer generating unit 25 when a control signal corresponding to timing for generating a background layer is supplied to the background layer generating unit 25.

The processor 250 requests transfer of a color image and a foreground layer (S110), and generates a background layer on the basis of the color image and the foreground layer inputted thereto by using a method disclosed in, for example, Japanese Patent Application Laid-Open No. 2002-94805 or 2004-229261 (S102). Although a foreground mask is used instead of a foreground layer in this method, a background layer can be generated in the same manner as in this method by regarding, among pixels included in the foreground layer, a pixel of a color image corresponding to a pixel having a foreground identifier as the foreground and a pixel of the color image corresponding to a pixel having a background identifier as the background.

In this case, a foreground pixel of a color image is covered by a pixel value of a background pixel positioned in the vicinity of the foreground pixel. In the case where there is no background pixel in the vicinity of the foreground pixel, namely, in the case where there are merely foreground pixels in the vicinity of the foreground pixel, the foreground pixel is covered by a pixel value of a foreground pixel having been already covered. It is noted that a foreground pixel may be covered not by a pixel value of one pixel but by an average pixel value of a plurality of pixels.

Next, the processor 220 determines whether or not the execution decision signal corresponding to the decision of the execution of both the lossless compression and the lossy compression has been inputted from the foreground layer generating unit 22 (S103), and when the execution decision signal has been inputted (YES in S103), the binary image compressing unit 24 generates a lossless compressed image. Specifically, information of the foreground is included in the foreground layer based on which the lossless compressed image has been generated. Therefore, the processor 250 performs, on the background layer generated in S102, various image processing performed on a conventional background layer. Specifically, the resolution of the background layer generated in S102 is lowered to a half (S104), filter process for smoothing the background layer as a whole is performed (S105), and rather weak contrast enhancement process is performed (S106). As a result, the file size is reduced.

In the case where the inhibition decision signal corresponding to the inhibition of the execution of the lossless compression and the decision of the execution of the lossy compression has been inputted from the foreground layer generating unit 22 (NO in S103), the binary image compressing unit 24 does not generate a lossless compressed image. The information of the foreground is included in the background layer. Therefore, the processor 250 performs, on the background layer generated in S102, prescribed image processing for enhancing an image included in the background layer. For this purpose, at least one of the resolution of the background layer, the degree of filter enhancement and the contrast is made to be different from that obtained when the execution decision signal is inputted. As a result, the image quality attained after the lossy compression can be improved so that a text corresponding to the foreground cannot become illegible. A specific example of the processing is as follows:

In the background layer generated in S102, the resolution is not changed. Furthermore, the processor 250 performs a filtering process for rather enhancing an edge portion of the background layer while rather smoothing a portion other than the edge portion (S107), and performs rather strong contrast enhancement processing (S108). After completing the procedure of S106 or S108, the processor 250 outputs the generated background layer to the transfer control unit 12 (S109), and the background image processing is completed. The background layer thus outputted is outputted to the image memory 11 through the transfer control unit 12 so as to be stored in the image memory 11.

In the case where the foreground layer inputted to the background layer generating unit 25 is a generated foreground layer, a background layer generated by the background layer generating unit 25 includes information of the background and does not include the information of the foreground in the same manner as a conventional background layer generated on the basis of a color image and a foreground mask. On the other hand, in the case where the foreground layer inputted to the background layer generating unit 25 is a corrected foreground layer, a background layer generated by the background layer generating unit 25 includes the information of the background and information of a part of the foreground having been regarded as the background. Furthermore, in the case where the foreground layer inputted to the background layer generating unit 25 is an all-substituted foreground layer, a background layer generated by the background layer generating unit 25 includes all the information of both the foreground and the background and is equal to one obtained by performing prescribed image processing on the color image itself.

In the background image compressing unit 26 illustrated in FIG. 1, one background layer as illustrated in FIG. 4B is lossy compressed. For this purpose, a background layer transferred from the image memory 11 is inputted through the transfer control unit 12 to the background image compressing unit 26, and a processor not shown of the background image compressing unit 26 generates one lossy compressed image by a known method on the basis of the inputted background layer, and the generated lossy compressed image is outputted from the background image compressing unit 26 and transferred through the transfer control unit 12 to the image memory 11 to be written in the image memory 11.

As described so far, one color image is separated into a foreground layer and a background layer; N or M lossless compressed images obtained by compressing the foreground layer, a lossy compressed image obtained by compressing the background layer and information used for decompressing the respective compressed images including an IC table stored in the table storage 221 are brought into one compression file; and the color image compression process is completed. Alternatively, a color image is separated into a foreground layer and a background layer; a lossy compressed image obtained by compressing the background layer and information used for decompressing the lossy compressed image are brought into one compression file; and the color image compression process is completed.

According to this image compressing apparatus 1, high image quality and a small file size attained after the compression can be compatible with each other in accordance with a selected compression mode by using one kind of lossless compression technique and one kind of lossy compression technique neither with the same color decreasing processing repeatedly executed nor with a plurality of hardware used for realizing a plurality of kinds of lossless compression techniques.

It is noted that not only the prescribed number K of pixels but also the number N of kinds of foreground identifiers, the prescribed number P, the prescribed number Q and the like may be determined for every compression depending upon the document size of a color image, the number of pixels, the rectangle size of a foreground, or whether the priority is placed on a file size or image quality. Alternatively, the prescribed number K of pixels may be changed in accordance with the compression mode.

Embodiment 2

Figure 20:
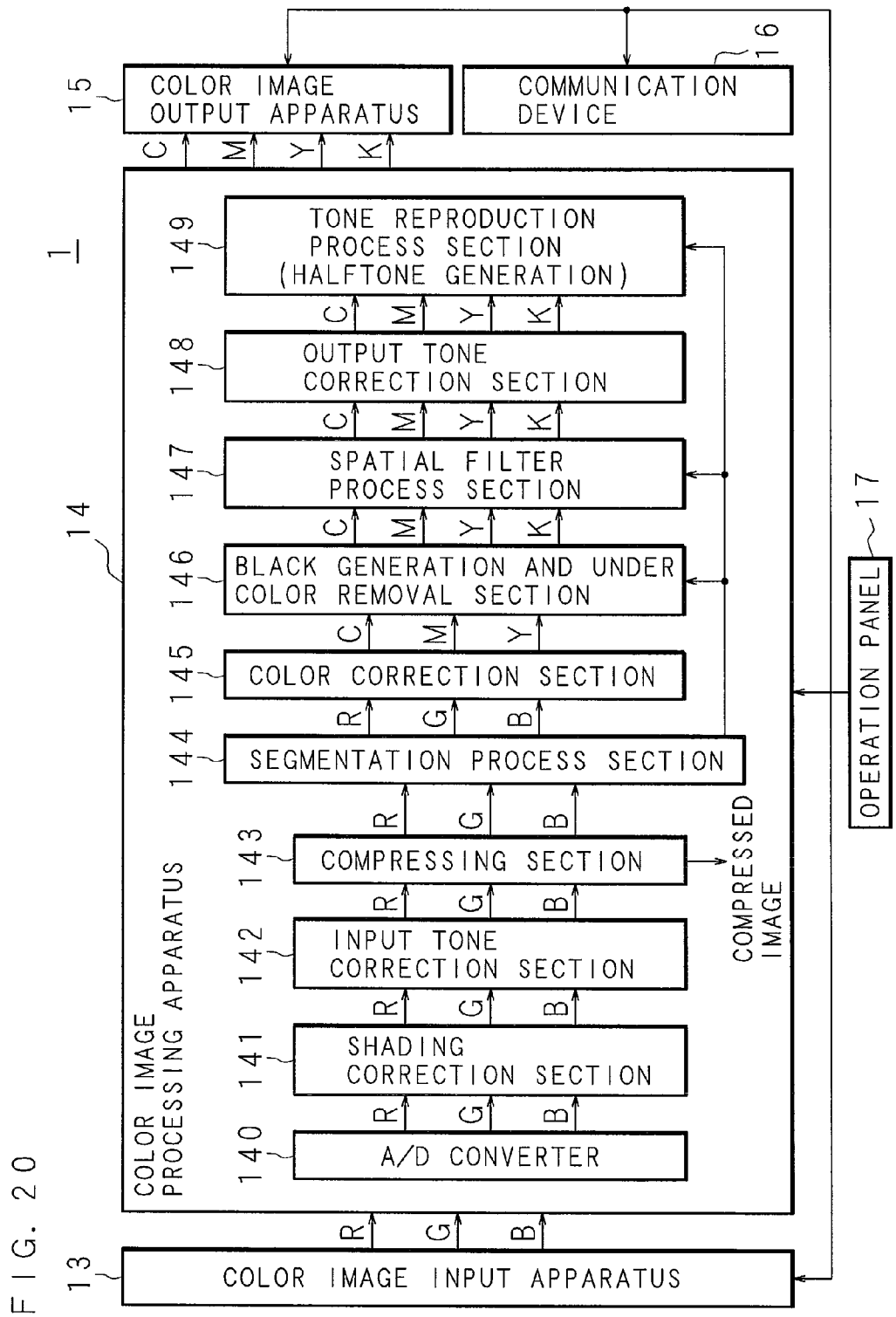
FIG. 20 is a block diagram illustrating the configuration of a principal part of an image forming apparatus according to Embodiment 2.

FIG. 20 is a block diagram illustrating the configuration of a principal part of an image forming apparatus according to Embodiment 2 of the invention. In this embodiment, a digital multi-function printer having a color copier function and a color scanner function is described as an example of the image forming apparatus.

The image forming apparatus includes a color image input apparatus 13, a color image processing apparatus 14, a color image output apparatus 15, a communication device 16 and an operation panel 17. The color image processing apparatus 14 includes an A/D converter 140, a shading correction section 141, an input tone correction section 142 and a compressing section 143, and the compressing section 143 corresponds to the image compressing apparatus 1 of Embodiment 1. The operations of the respective components of the image forming apparatus are controlled by a CPU not shown corresponding to the CPU 10 of Embodiment 1.

The color image processing apparatus 14 further includes a segmentation process section 144, a color correction section 145, a black generation and under color removal section 146, a spatial filter process section 147, an output tone correction section 148 and a tone reproduction process section 149. The operation panel 17 corresponds to the operation panel 17 of Embodiment 1 and is connected to the color image input apparatus 13, the color image processing apparatus 14, the color image output apparatus 15 and the communication device 16. The color image input apparatus 13 is connected to an input side of the color image processing apparatus 14 and includes a color scanner unit not shown corresponding to the color scanner unit 130 of Embodiment 1. This color scanner unit reads a reflected light image from a document by using a CCD as an analog signal with an RGB value and inputs the analog signal to the color image processing apparatus 14.

A color image corresponding to an analog signal inputted from the color image input apparatus 13 is transferred, within the color image processing apparatus 14, to the A/D converter 140, the shading correction section 141, the input tone correction section 142, the compressing section 143, the segmentation process section 144, the color correction section 145, the black generation and under color removal section 146, the spatial filter process section 147, the output tone correction section 148 and the tone reproduction process section 149 in this order, so as to be stored once in the image memory 11. The color image stored in the image memory 11 is read at a prescribed timing to be outputted to the color image output apparatus 15 in the form of a stream.

The color image output apparatus 15 functions as an image forming unit that forms a color image on a recording sheet (such as a recording paper) and outputs the resultant, and is an image forming apparatus employing, for example, the electrophotographic method or the inkjet method, but is not particularly specified. It is noted that the image forming apparatus may include a monochrome image output apparatus instead of the color image output apparatus 15. In this case, a color image is converted into a monochrome image in the color image processing apparatus 14 before being outputted to the monochrome image output apparatus.

Now, the image processing performed in the color image processing apparatus 14 will be described in detail. The A/D converter 140 converts analog RGB signals into digital RGB signals, and the shading correction section 141 performs, on the digital RGB signals sent from the A/D converter 140, processing for removing various distortions caused in a lighting system, an image focusing system and an image sensing system of the color image input apparatus 13. The input tone correction section 142 performs input tone correction process on the RGB signals from which the various distortions have been removed by the shading correction section 141 (namely, reflectance signals of RGB). The input tone correction process is a processing for adjusting color balance and converting an input signal into a signal such as a density (pixel value) signal that can be easily dealt with by the color image processing apparatus 14.

The compressing section 143 performs the color image compression process on the RGB signals having been subjected to the input tone correction process (namely, a color image inputted to the foreground mask generating unit 21, the foreground layer generating unit 22 and the background layer generating unit 25 in Embodiment 1). A resultant compressed color image is stored once in the image memory not shown corresponding to the image memory 11 of Embodiment 1. Thereafter, when, for example, a "scan to e-mail" mode is selected in the operation panel 17, the color image is attached to an e-mail by the communication device 16 including a network card, a modem or the like to be transmitted to a set destination. When the color image compressing process is not performed, the compressing section 143 outputs the RGB signals inputted from the input tone correction section 142 directly to the following segmentation process section 144.

The segmentation process section 144 separates, on the basis of the inputted RGB signals, respective pixels into any of a text segment, a halftone segment and a photograph segment. The segmentation process section 144 outputs, on the basis of the separation result, a segmentation class signal representing a segment of each pixel to the black generation and under color removal section 146, the spatial filter process section 147 and the tone reproduction process section 149, and also outputs the RGB signals inputted from the input tone correction section 142 directly to the following color correction section 145. The color correction section 145 performs, for reproducing colors with fidelity, processing for removing color impurity on the basis of the spectral characteristics of color materials of CMY (C: cyan, M: magenta and Y: yellow) including unnecessary absorbed components.

The black generation and under color removal section 146 performs black generation process for generating black (K) signals from CMY three-color signals obtained after the color correction and processing for generating new CMY signals by subtracting the K signals obtained through the black generation from the original CMY signals. As a result, the CMY three-color signals are converted into CMYK four-color signals. As an example of the black generation process, a method for generating black by using skeleton black is employed in general. In this method, assuming that the input/output characteristic of a skeleton curve is y=f(x), that input data are C, M and Y, that output data are C', M', Y' and K', and that the UCR (Under Color Removal) ratio is a (0<a<1), the black generation and under color removal process is expressed by the following expressions (1) through (4):

$$K'=f\{\min(C,M,Y)\} \quad (1)$$

$$C'=C-aK' \quad (2)$$

$$M'=M-aK' \quad (3)$$

$$Y'=Y-aK' \quad (4)$$

The spatial filter process section 147 performs, for correcting the spatial frequency characteristic, spatial filtering process on color image of the CMYK signals inputted from the black generation and under color removal section 146 by using a digital filter on the basis of the segmentation class signal inputted from the segmentation process section 144, so as to prevent blur and graininess degradation of a color image outputted from the color image output apparatus 15. The tone reproduction process section 149 performs prescribed processing on the color image of the CMYK signals on the basis of the segmentation class signal inputted from the segmentation process section 144 similarly to the spatial filter process section 147.

For example, in a segment separated as a text segment by the segmentation process section 144, a high frequency component is sharpened by edge enhancement process in the spatial filtering process performed by the spatial filter process section 147 for improving the reproducibility of a black text or a colored text in particular. Furthermore, in the tone reproduction process section 149, a binarization process or a multi-level dithering process with high resolution screen suitable for reproducing a high frequency is selected. Moreover, a segment separated as a halftone segment by the segmentation process section 144 is subjected to low-pass filtering process for removing an input halftone component by the spatial filter process section 147.

A color image outputted from the spatial filter process section 147 is subjected to output tone correction process for converting a signal such as a density signal into a halftone area ratio, that is, a characteristic value of the color image output apparatus 15, by the output tone correction section 148, and is then subjected, by the tone reproduction process section 149, to tone reproduction process (halftone generation) for reproducing tones of respective pixels ultimately separated from the image. However, a segment separated as a photograph segment by the segmentation process section 144 is subjected to the binarization process or the multi-level dithering process with a screen suitable for tone reproduction.

In the case where facsimile transmission is performed, the CPU of the image forming apparatus proceeds a communication procedure with a destination by using the communication device 16 including a modem, and when it is ready for sending, the CPU reads a color image having been compressed in a prescribed format (namely, a compressed image of a color image read by the color image input apparatus 13) from the image memory 11, and performs necessary processing such as conversion of a compressing method before transmitting it to the destination through a communication line.

In receiving facsimile, the CPU of the image forming apparatus receives a color image sent from an originating communication device while proceeding a communication procedure and inputs the received color image to the color image processing apparatus 14, and the color image processing apparatus 14 performs decompressing process on the received color image by a compressing/decompressing process unit not shown. The decompressed color image is subjected to rotation process and/or resolution conversion process by a processor not shown if necessary, is subjected to the output tone correction process by the output tone correction section 148 and the tone reproduction process by the tone reproduction process section 149, and is outputted from the color image output apparatus 15. Furthermore, the CPU of the image forming apparatus executes data communication with a computer, another digital multi-function printer or the like connected to a network through a network card and a LAN cable not shown.

Although the compressing section 143 is provided at the previous stage of the segmentation process section 144 in the above description, the compressing section 143 may be provided at the following stage of the segmentation process section 144 so as to generate a foreground mask on the basis of the result of the segmentation process. Furthermore, image data outputted from the compressing section 143 may be stored once in a large capacity storage such as a hard disk so as to be read from the large capacity storage in response to a printing request made by a user before performing the subsequent processing.

Embodiment 3

According to the present invention, the image compressing method of the invention may be recorded in a computer-readable recording medium in which program codes (an execute form program, an intermediate code program and a source program) of a computer program to be executed by a computer are recorded. As a result, a recording medium storing the program codes for causing a computer to execute the present image compressing method is portably provided.

It is noted that the recording medium may be a program medium using a memory not shown such as a ROM for performing the process by a microcomputer or may be a program medium obtained by providing a program code reader as an external memory not shown and loading the recording medium in the reader for reading the program codes.

In both cases, the stored computer program may be executed through access by a microprocessor or may be executed by a method in which the program codes are read to be downloaded to a program storage area not shown of the microcomputer for executing the program codes. It is assumed that a computer program used for the download is previously stored in a main apparatus.

At this point, the program medium is a recording medium separable from the main apparatus, and may be any of media fixedly holding the computer program including a tape type medium such as a magnetic tape or a cassette tape; a disk type medium such as a magnetic disk of a floppy (registered trademark) disk or a hard disk, or an optical disk of a CD-ROM, an MO, an MD or a DVD; a card type medium such as an IC card (including a memory card) or an optical card; and a semiconductor memory such as a mask ROM, an EPROM (Erasable Programmable Read Only Memory), an EEPROM (Electrically Erasable Programmable Read Only Memory) or a flash ROM.

In the system structure of this embodiment, a communication network including the Internet can be connected, and therefore, the recording medium may be a medium for fluently holding the computer program in such a manner as to download the program codes from the communication network. In the case where the program codes are downloaded from the communication network in this manner, a computer program used for the download may be previously stored in the main apparatus or may be installed from another recording medium. It is noted that the present invention may be embodied with the program codes provided in the form of computer data signals electrically transferred and buried in carrier waves. The aforementioned image compressing method is executed by reading the recording medium with a computer program reader provided in a digital color image forming apparatus or a computer system.

The computer system includes an image input apparatus such as a flat bed scanner, a film scanner or a digital camera; a computer that performs various processing including the image compressing method by loading desired computer programs; an image display device for displaying the results of processing performed by the computer, such as a CRT display or a liquid crystal display; and a printer that outputs the results of the processing performed by the computer on a recording sheet or the like. The computer system further includes a network card or a modem as a communication means for connecting the computer system to a server or the like through the network.

Figure 21:
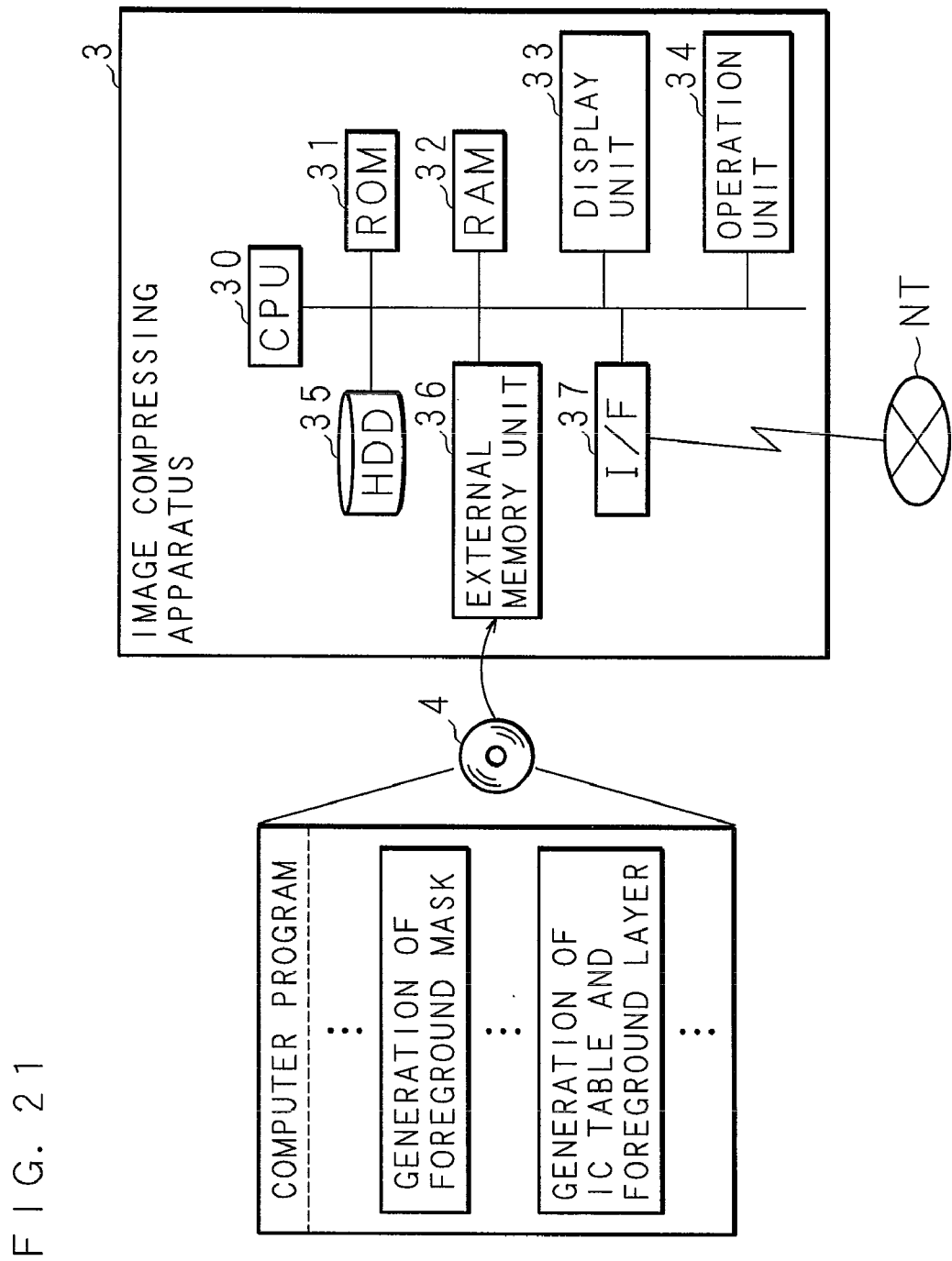
FIG. 21 is a block diagram illustrating the configuration of a principal part of an image compressing apparatus according to Embodiment 3.

Now, an image compressing apparatus constructed by using a personal computer will be exemplified. FIG. 21 is a block diagram illustrating the configuration of a principal part of an image compressing apparatus according to Embodiment 3 of the invention.

In FIG. 21, a reference numeral 3 denotes the image compressing apparatus, which includes a CPU 30, a ROM 31, a RAM 32, a display unit 33, an operation unit 34, an HDD (hard disk) 35, an external memory unit 36 and an I/F (interface) 37, and these components are appropriately connected to one another through a bus, signal line or the like. The image compressing apparatus 3 is connected to a network NT through the I/F 37 so as to communicate with another personal computer connected to the network NT.

The HDD 35 is an auxiliary memory unit of the image compressing apparatus 3, and various computer programs, data and the like are read/written from/in the HDD 35. The external memory unit 36 includes, for example, a CD-ROM drive, and is controlled by the CPU 30 so as to read a computer program, data or the like from a portable recording medium (such as a CD-ROM 4 recording the computer program of this embodiment). The computer program, data or the like thus read is written in the HDD 35.

The CPU 30 is a control center of the image compressing apparatus 3 and controls the respective components of the apparatus in accordance with a computer program, data or the like stored in the ROM 31 and/or the HDD 35 with the RAM 32, that is, a main memory unit, used as a working space, for executing various processing. More specifically, the personal computer functions as the image compressing apparatus 3 of this embodiment by the CPU 30 of the personal computer executing, in accordance with the computer program of this invention, a color image compression process including foreground mask generating process (see S123 illustrated in FIG. 22 described below) and IC table and foreground layer generating process (also see S124 of FIG. 22).

The display unit 33 includes, for example, a liquid crystal display, and is controlled by the CPU 30 so as to display, for example, a message corresponding to the operation state of the image compressing apparatus 3 or a message corresponding to any of various instructions to a user. The operation unit 34 includes, for example, a keyboard and a mouse. A user of the image compressing apparatus 3 operates the operation unit 34 while watching the display unit 33, so as to generate a color image by using, for example, software for drawing an image or software for generating a manuscript and to store the generated image in the HDD 35. Also, a user operates the image compressing apparatus 3 so as to compress a color image stored in the HDD 35 and to send, for example, an e-mail with the compressed image attached.

Although the image compressing apparatus is realized by using a personal computer in the above description, an image processing apparatus may be realized with the image compressing apparatus of this embodiment combined with other image processes such as color correction process, filtering process and halftone process.

Figure 22:
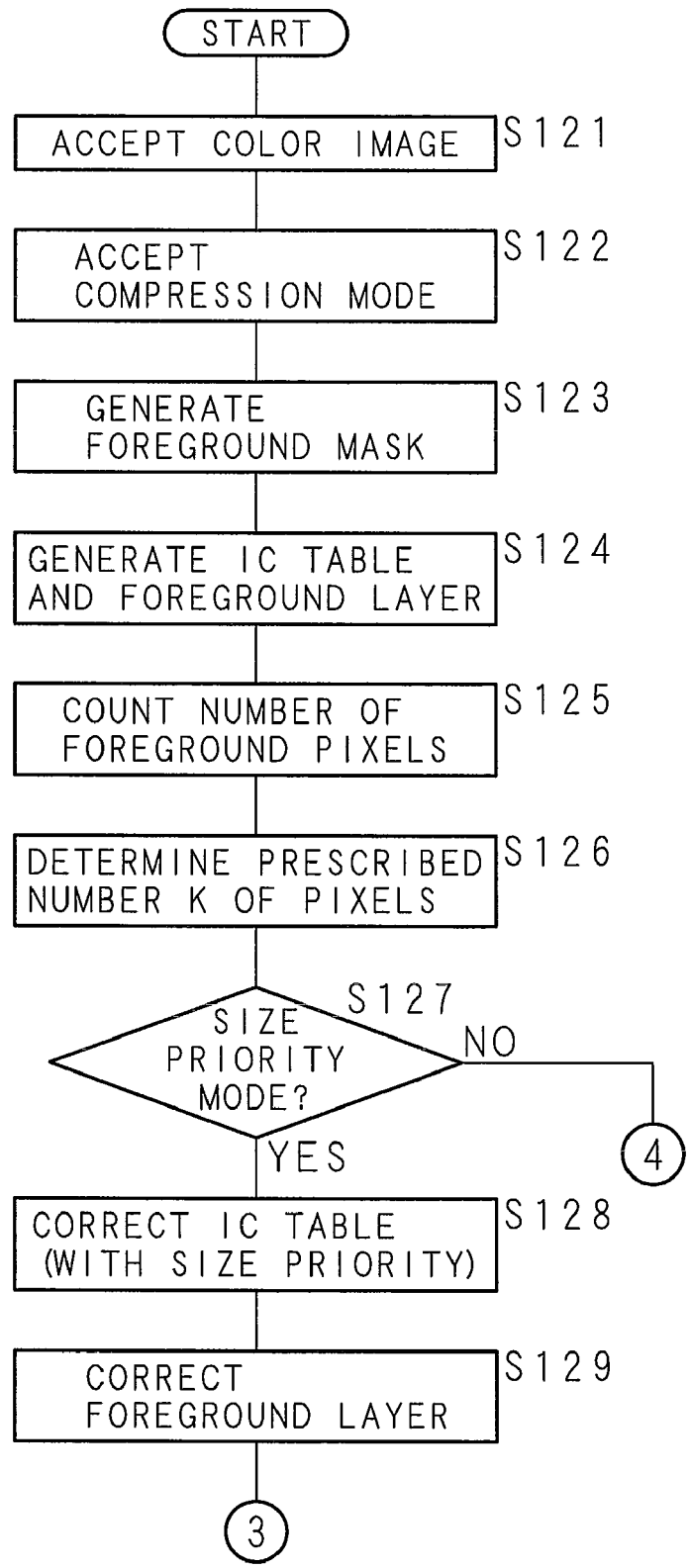
FIG. 22 is a flowchart illustrating procedures in a color image compression process executed in the image compressing apparatus of Embodiment 3.
Figure 24:
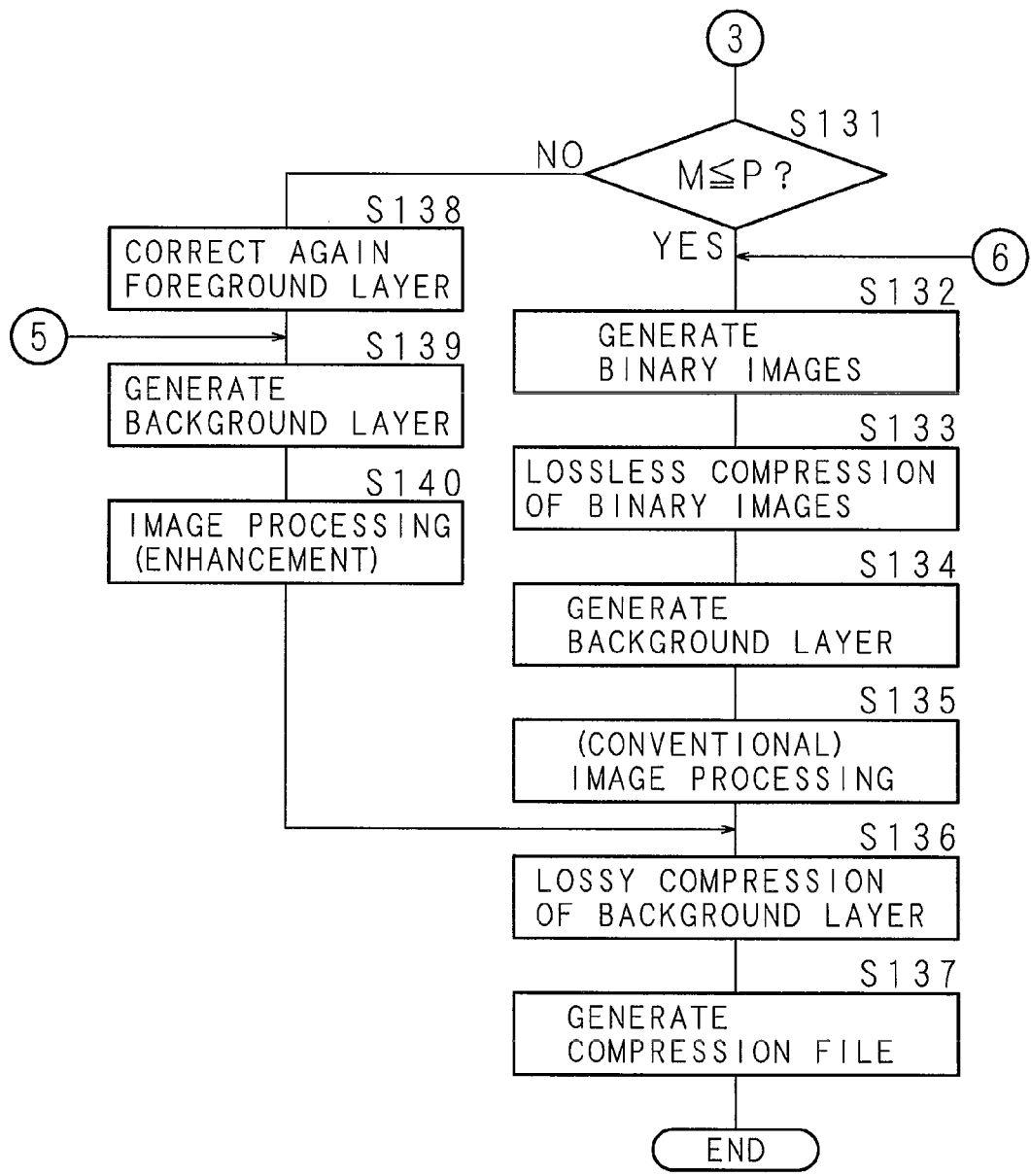
FIG. 24 is a flowchart illustrating procedures in the color image compression process executed in the image compressing apparatus of Embodiment 3

FIGS. 22, 23 and 24 are flowchart illustrating procedures in a color image compression process executed in the image compressing apparatus 3. The color image compression process is executed, for example, in response to an operation performed by a user desiring compression of a color image.

The CPU 30 accepts one color image (S121) and accepts either a size priority compression mode or a quality priority compression mode (S122). A user operates the operation unit 34 while watching the display unit 33, so as to specify one color image stored in, for example, the HDD 35 as a color image to be compressed and to select one of the compression modes. In other words, the operation unit 34 functions as a selecting unit in S122.

The CPU 30 generates a foreground mask on the basis of the color image accepted in S121 (S123). The CPU 30 functions as a foreground mask generating unit in S123. The foreground mask thus generated is stored in the HDD 35. Next, the CPU 30 generates a generated IC table and a generated foreground layer on the basis of the color image accepted in S121 and the foreground mask generated in S123 (S124). The CPU 30 functions as a foreground layer generating unit and a table generating unit in S124. The generated IC table and the generated foreground layer thus generated are stored in the HDD 35.

The CPU 30 counts the number of pixels of a foreground on the basis of data stored in the generated IC table (S125) and determines a prescribed number K of pixels on the basis of the count result (S126). At this point, the CPU 30 functions as a pixel number determining unit in S126. The CPU 30 determines whether or not the size priority compression mode has been accepted in S122 (S127). The CPU 30 functions as a reduction determining unit in S127.

When the size priority compression mode has been accepted in S122 (YES in S127), the CPU 30 executes various processing for reducing the number of kinds of foreground identifiers to be smaller than N. The CPU 30 corrects the generated IC table to a corrected IC table by replacing a foreground identifier corresponding to pixels in number smaller than the prescribed number K with a background identifier (S128). The CPU 30 functions as a table replacing unit in S128. The detailed procedure of S128 is the same as that of the size priority IC table processing illustrated in FIG. 11. Therefore, even when the generated IC table does not store a foreground identifier corresponding to pixels in number smaller than the prescribed number K, N is substituted for M, so that the generated IC table and the generated foreground layer that have not been substantially corrected can be dealt with as a corrected IC table and a corrected foreground layer.

Subsequently, the CPU 30 corrects the generated foreground layer to a corrected foreground layer by replacing the foreground identifier having been replaced with the background identifier in the corrected IC table with the background identifier with respect to pixels included in the generated foreground layer (S129). The CPU 30 functions as a foreground layer correcting unit in S129. After completing the procedure of S129, the CPU 30 determines whether or not the number M of kinds of foreground identifiers is not more than a prescribed number P (S131), and when $M \leq P$ (YES in S131), the CPU 30 generates M binary images on the basis of the corrected foreground layer (S132) and subjects the generated binary images to lossless compression (S133). The CPU 30 functions as a binary image generating unit and a binary image compressing unit in S132 and S133.

Then, the CPU 30 generates a background layer on the basis of the color image and the corrected foreground layer (S134) and performs, on the generated background layer, various image processing similar to those performed on a conventional background layer (S135). Specifically, the CPU 30 lowers the resolution of the background layer generated in S134 to a half, performs filtering process for smoothing the background layer as a whole, and performs rather weak contrast enhancement processing. Ultimately, the CPU 30 subjects the background layer to lossy compression (S136) and generates a compression file (S137). At this point, the generated compression file includes M lossless compressed images obtained based on the corrected foreground layer, one lossy compressed image obtained based on the background layer and the corrected IC table. The CPU 30 functions as a background generating unit and a background image compressing unit in S134 and S136.

On the other hand, when M>P (NO in S131), the CPU 30 corrects the corrected foreground layer again by replacing all foreground identifiers with the background identifier with respect to all pixels included in the corrected foreground layer (S138). Subsequently, the CPU 30 generates a background layer on the basis of the color image and the corrected foreground layer corrected again in S138 (namely, an all-replaced foreground layer) (S139), and performs, on the generated background layer, various image processing for enhancing an image included in the background layer (S140). Specifically, the CPU 30 performs a filtering process for rather enhancing an edge portion of the background layer and rather smoothing a portion other than the edge portion without changing the resolution of the background layer generated in S134, and further performs rather strong contrast enhancement processing.

After completing the procedure of S140, the CPU 30 proceeds the procedure to S136. At this point, the compression file generated in S137 includes one lossy compressed image obtained based on the background layer but includes neither a lossless compressed image obtained based on the foreground layer nor an IC table. When the quality priority compression mode is accepted in S122 (NO in S127), the CPU 30 determines whether or not the number N of kinds of foreground identifiers exceeds the prescribed number P and is not more than the prescribed number Q (S141). When P<N≦Q (YES in S141), the CPU 30 executes various processing for reducing the number of kinds of foreground identifiers to be smaller than N. It is assumed in the following description that the generated IC table stores a foreground identifier corresponding to pixels in number smaller than the prescribed number K.

The CPU 30 corrects the generated IC table to a corrected IC table by replacing foreground identifiers with the background identifier successively in the ascending order of the number of pixels from a foreground identifier corresponding to pixels, which are smaller in number than the prescribed number K and are the smallest in number, under a condition that the number M of kinds of foreground identifier is not less than the prescribed number P (S142). A detailed procedure in S142 is similar to that of the quality priority IC table processing illustrated in FIG. 14. Subsequently, the CPU 30 corrects the generated foreground layer to a corrected foreground layer by replacing the foreground identifier having been replaced with the background identifier in the corrected IC table with the background identifier with respect to pixels included in the generated foreground layer (S143), and proceeds the procedure to S131. At this point, the CPU 30 functions as a table replacing unit and a foreground layer correcting unit in S142 and S143.

When the condition of P<N≦Q is not met (NO in S141), the CPU 30 determines whether or not the number N of kinds of foreground identifiers is not more than the prescribed number P (S144), and when N≦P (YES in S144), the procedure is proceeded to S132. At this point, the CPU 30 generates N binary images on the basis of the generated foreground layer in S132 and subjects the N binary images to the lossless compression in S133. As a result, a compression file generated in S137 includes N lossless compressed images obtained based on the generated foreground layer, one lossy compressed image obtained based on the background layer and the generated IC table. On the other hand, when N>Q (NO in S144), the CPU 30 corrects the generated foreground layer by replacing all foreground identifiers with the background identifier with respect to pixels included in the generated foreground layer (S145) and proceeds the procedure to S139.

According to the image compressing apparatus 3 described above, high quality of a compressed image and a small file size can be compatible with each other in accordance with the selected compression mode by employing one kind of lossless compression technique and one kind of lossy compression technique without repeatedly executing the same color decreasing process.

It is to be understood that the embodiments herein described are to be taken as merely examples rather than limitation. It is intended to cover in the appended claims all modifications as fall within the true spirit and scope of the invention.

Furthermore, the image compressing apparatus 1 or 3 or the image forming apparatus may include any component not described in Embodiments 1 through 3 as far as the effects of the invention are attained.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image compressing method for compressing a color image, comprising steps of:
generating, on the basis of the color image, a foreground mask representing pixels of a foreground corresponding to a text and/or a line drawing included in the color image;
generating, on the basis of the generated foreground mask and the color image, a foreground layer by replacing color information of respective pixels of the foreground with N (wherein N is a natural number) kinds of foreground identifiers for identifying color information included in the foreground and by replacing color information of each pixel of a background with a background identifier indicating the background;
generating a table in which color information included in the foreground, a foreground identifier for identifying the color information and the number of pixels having the foreground identifier are correlated and stored with one another;
reducing, when the number of kinds of foreground identifiers is to be reduced to be smaller than N, the number of kinds of foreground identifiers to M (wherein M is a natural number smaller than N) by replacing one kind or a plurality of kinds of foreground identifiers included in the table with the background identifier on the basis of the numbers of pixels stored in the table;
correcting, on the basis of the table in which the foreground identifier has been replaced with the background identifier, the foreground layer to a corrected foreground layer by replacing the foreground identifier included in the generated foreground layer with the background identifier;

generating, on the basis of the corrected foreground layer, M binary images, each of which is obtained by binarizing a pixel value of one kind of foreground identifier and pixel values of the other kinds of foreground identifiers, respectively corresponding to the M kinds of foreground identifiers;

performing lossless compression on the generated M binary images;

generating a background layer on the basis of the corrected foreground layer and the color image; and performing lossy compression on the generated background layer.

2. An image compressing apparatus for compressing a color image, comprising:

a foreground mask generating unit that generates, on the basis of the color image, a foreground mask representing pixels of a foreground corresponding to a text and/or a line drawing included in the color image;

a foreground layer generating unit that generates, on the basis of the foreground mask generated by the foreground mask generating unit and the color image, a foreground layer by replacing color information of respective pixels of the foreground with N (wherein N is a natural number) kinds of foreground identifiers for identifying color information included in the foreground and by replacing color information of each pixel of a background with a background identifier indicating the background;

a table generating unit that generates a table in which color information included in the foreground, a foreground identifier for identifying the color information and the number of pixels having the foreground identifier are correlated and stored with one another;

a reduction determining unit that determines whether or not the number of kinds of foreground identifiers is to be reduced to be smaller than N;

a table replacing unit that reduces, when the reduction determining unit determines that the number of kinds of foreground identifiers is to be reduced, the number of kinds of foreground identifiers to M (wherein M is a natural number smaller than N) by replacing one kind or a plurality of kinds of foreground identifiers included in the table with the background identifier on the basis of the numbers of pixels stored in the table generated by the table generating unit;

a foreground layer correcting unit that corrects, on the basis of the table in which the foreground identifier has been replaced with the background identifier by the table replacing unit, the foreground layer to a corrected foreground layer by replacing the foreground identifier included in the foreground layer generated by the foreground layer generating unit with the background identifier;

a binary image generating unit that generates, on the basis of the foreground layer corrected by the foreground layer correcting unit, M binary images, each of which is obtained by binarizing a pixel value of one kind of foreground identifier and pixel values of the other kinds of foreground identifiers, respectively corresponding to the M kinds of foreground identifiers;

a binary image compressing unit that performs lossless compression on the M binary images generated by the binary image generating unit;

a background generating unit that generates a background layer on the basis of the foreground layer corrected by the foreground layer correcting unit and the color image; and a background image compressing unit that performs lossy compression on the background layer generated by the background generating unit.

3. The image compressing apparatus according to claim 2, further comprising:

a selecting unit that selects either a first compression mode in which priority is placed on a small file size of a compressed image obtained after compression over high image quality of the compressed image or a second compression mode in which priority is placed on high image quality of the compressed image over a small file size of the compressed image, wherein the reduction determining unit determines whether or not the number of kinds of foreground identifiers is to be reduced to be smaller than N in accordance with the first or second compression mode selected by the selecting unit.

4. The image compressing apparatus according to claim 3, wherein the reduction determining unit determines to reduce the number of kinds of foreground identifiers to be smaller than N when the first compression mode is selected by the selecting unit, and the table replacing unit replaces a foreground identifier corresponding to pixels in number smaller than a prescribed number of pixels with the background identifier among pixels stored in the table generated by the table generating unit.

5. The image compressing apparatus according to claim 3, wherein in the case where the second compression mode is selected by the selecting unit, the reduction determining unit determines to reduce the number of kinds of foreground identifiers to be smaller than N when the number N of kinds of foreground identifiers is larger than a prescribed number P (wherein P is a natural number), and the table replacing unit replaces, under a condition that the number M resulting from the reduction is not less than the prescribed number P, a foreground identifier corresponding to pixels in number smaller than a prescribed number with the background identifier successively in the ascending order of the number of pixels among pixels stored in the table generated by the table generating unit.

6. The image compressing apparatus according to claim 5, wherein in the case where the second compression mode is selected by the selecting unit, the reduction determining unit determines to reduce the number of kinds of foreground identifiers to be smaller than N when the number N of kinds of foreground identifiers is larger than the prescribed number P and is not more than a prescribed number Q (wherein Q is a natural number larger than P).

7. The image compressing apparatus according to claim 5, wherein when the reduction determining unit determines not to reduce the number and the number N of kinds of foreground identifiers stored in the table generated by the table generating unit is larger than the prescribed number P, or when the reduction determining unit determines to reduce the number and the number M resulting from the reduction by the table replacing unit is larger than the prescribed number P, the foreground layer correcting unit corrects the foreground layer generated by the foreground layer generating unit to a corrected foreground layer by replacing all foreground identifiers included in the generated foreground layer with the background identifier;

generation of the binary image by the binary image generating unit and compression by the binary image compressing unit are not carried out; and the background image compressing unit performs, on the background layer generated by the background generating unit, a prescribed image processing for enhancing an image included in the background layer before performing the lossy compression.

8. The image compressing apparatus according to claim 4, further comprising:

a pixel number determining unit that determines the prescribed number of pixels in accordance with a document size of the color image or information of a foreground included in the foreground layer generated by the foreground layer generating unit.

9. The image compressing apparatus according to claim 2, wherein in the case where the reduction determining unit determines not to reduce the number, the binary image generating unit generates, on the basis of the foreground layer generated by the foreground layer generating unit, N binary images, each of which is obtained by binarizing a pixel value of one kind of foreground identifier and pixel values of the other kinds of foreground identifiers, respectively corresponding to the N kinds of foreground identifiers;

the binary image compressing unit performs the lossless compression on each of the N binary images generated by the binary image generating unit; and the background generating unit generates the background layer on the basis of the foreground layer generated by the foreground layer generating unit and the color image.

10. An image forming apparatus, comprising:
the image compressing apparatus of claim 2; and
an image forming unit that forms an image on a recording sheet.

11. A non-transitory computer readable medium in which a computer program for compressing a color image is recorded, the computer program comprising steps of:

causing a computer to generate, on the basis of the color image, a foreground mask representing pixels of a foreground corresponding to a text and/or a line drawing included in the color image;

causing the computer to generate, on the basis of the generated foreground mask and the color image, a foreground layer by replacing color information of respective pixels of the foreground with N (wherein N is a natural number) kinds of foreground identifiers for identifying color information included in the foreground and by replacing color information of each pixel of a background with a background identifier indicating the background;

causing the computer to generate a table in which color information included in the foreground, a foreground identifier for identifying the color information and the number of pixels having the foreground identifier are correlated and stored with one another;

causing the computer to determine whether or not the number of kinds of foreground identifiers is to be reduced to be smaller than N;

causing the computer to reduce, when the number of kinds of foreground identifiers is determined to be reduced to be smaller than N, the number of kinds of foreground identifiers to M (wherein M is a natural number smaller than N) by replacing one kind or a plurality of kinds of foreground identifiers included in the table with the background identifier on the basis of the numbers of pixels stored in the table;

causing the computer to correct, on the basis of the table in which the foreground identifier has been replaced with the background identifier, the foreground layer to a corrected foreground layer by replacing the foreground identifier included in the generated foreground layer with the background identifier;

causing the computer to generate, on the basis of the corrected foreground layer, M binary images, each of which is obtained by binarizing a pixel value of one kind of foreground identifier and pixel values of the other kinds of foreground identifiers, respectively corresponding to the M kinds of foreground identifiers;

causing the computer to perform lossless compression on the generated M binary images;

causing the computer to generate a background layer on the basis of the corrected foreground layer and the color image; and causing the computer to perform lossy compression on the generated background layer.

* * * * *